(12) United States Patent
Kurumado

(10) Patent No.: US 8,392,146 B2
(45) Date of Patent: Mar. 5, 2013

(54) SIGNAL PROCESSING CIRCUIT FOR ROTATION DETECTOR

(75) Inventor: Norihiro Kurumado, Nagoya (JP)

(73) Assignee: DENSO CORPORATION, Kariya (JP)

( * ) Notice: Subject to any disclaimer, the term of this patent is extended or adjusted under 35 U.S.C. 154(b) by 231 days.

(21) Appl. No.: 12/947,350

(22) Filed: Nov. 16, 2010

(65) Prior Publication Data
US 2011/0125456 A1 May 26, 2011

(30) Foreign Application Priority Data
Nov. 25, 2009 (JP) ................................. 2009-267898

(51) Int. Cl.
*G01P 3/00* (2006.01)
(52) U.S. Cl. ...................................................... 702/147
(58) Field of Classification Search .......... 702/147–148, 702/190; 324/207.13, 207.25
See application file for complete search history.

(56) References Cited

U.S. PATENT DOCUMENTS

| | | | |
|---|---|---|---|
| 4,434,470 A * | 2/1984 | Thomas et al. ............... | 702/147 |
| 7,385,387 B2 | 6/2008 | Kondo | |
| 2005/0203695 A1 | 9/2005 | Kassner | |
| 2007/0139036 A1 | 6/2007 | Kondo | |
| 2008/0141072 A1 * | 6/2008 | Kalgren et al. ................. | 714/33 |
| 2009/0063103 A1 | 3/2009 | Iwamoto et al. | |
| 2010/0225308 A1 | 9/2010 | Kurumado | |

FOREIGN PATENT DOCUMENTS

JP A-2007-170922 7/2007

OTHER PUBLICATIONS

Office Action mailed Sep. 14, 2012 in corresponding U.S. Appl. No. 12/659,349.
Notice of Allowance mailed Dec. 4, 2012 in corresponding U.S. Appl. No. 12/659,349.

* cited by examiner

*Primary Examiner* — Aditya Bhat
(74) *Attorney, Agent, or Firm* — Posz Law Group, PLC

(57) ABSTRACT

A signal processing circuit for a rotation detector includes a normal-rotation pulse request holding portion, a reverse-rotation pulse request holding portion, a resetting portion, and a waiting time switching portion. When an output of one of a normal-rotation pulse and a reverse-rotation pulse is finished and a waiting time elapses, the resetting portion resets an output request signal of the one of the normal-rotation pulse and the reverse-rotation pulse held by one of the pulse request holding portions. The waiting time switching portion sets the waiting time to a first waiting time when one of the pulse request holding portions holds the output request signal, and the waiting time switching portion sets the waiting time to a second waiting time longer than the first waiting time when both the pulse request holding portions hold the output request signals.

5 Claims, 11 Drawing Sheets

| | NORMAL | | REVERSE | |
|---|---|---|---|---|
| FIRST | ↓ | ↑ | ↓ | ↑ |
| SECOND | HI | LO | LO | HI |
| EDGE | EFFECTIVE | INEFFECTIVE | INEFFECTIVE | EFFECTIVE |

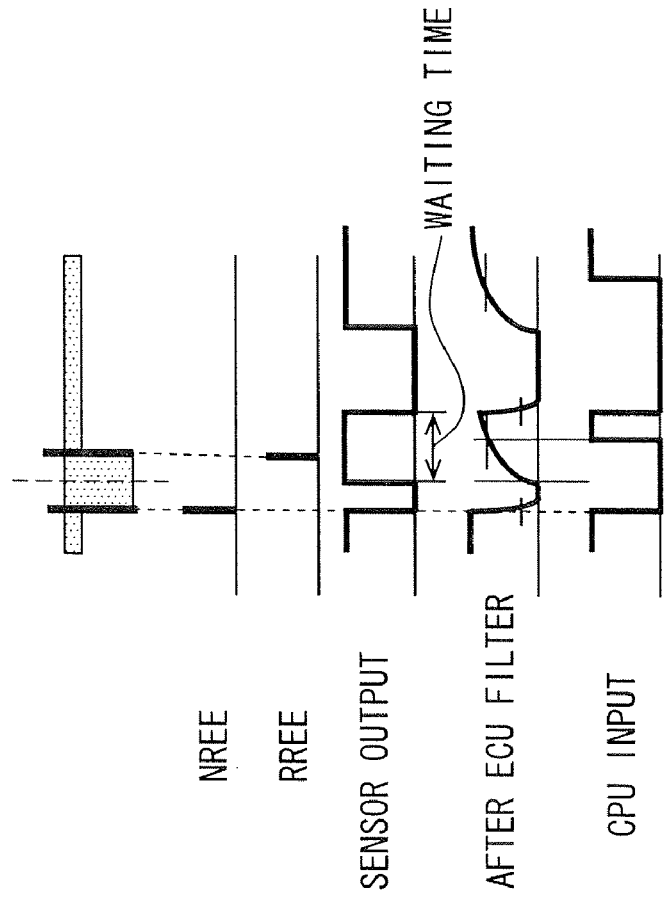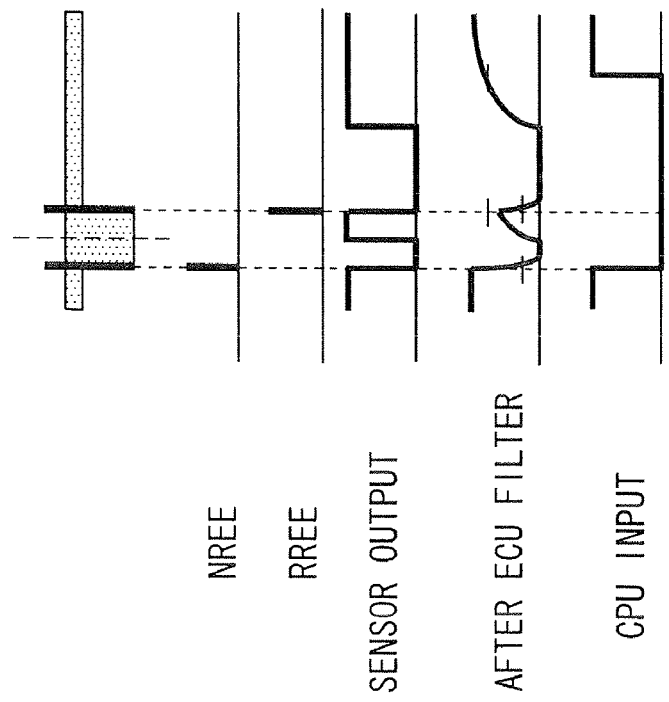

SIGNAL PROCESSING CIRCUIT FOR ROTATION DETECTOR

CROSS REFERENCE TO RELATED APPLICATIONS

The present application is based on and claims priority to Japanese Patent Application No. 2009-267898 filed on Nov. 25, 2009, the contents of which are incorporated in their entirety herein by reference.

BACKGROUND OF THE INVENTION

1. Field of the Invention

The present invention relates to a signal processing circuit for a rotation detector.

2. Description of the Related Art

A conventional signal processing circuit for a rotation detector is disclosed, for example, in JP-A-2007-170992 (corresponding to US 2007/0139036 A). The rotation detector includes two magnetic sensors. When a rotor having gear teeth rotates, the two magnetic sensors respectively output rotation detecting signals Sa and Sb having different phases. As shown in FIG. 13, the signal processing circuit determines that a rotational direction of the rotor is changed based on a change in a phase relationship between the rotation detecting signals Sa and Sb and generates a reverse signal REV. In addition, the signal processing circuit reads all edges of the rotation detecting signal Sa.

Then, the signal processing circuit generates a level-change prohibiting signal for prohibiting changes in a signal level that synchronize with a first rising edge and a first falling edge of the rotation detecting signal Sa after the change of the rotational direction. Based on the level-change prohibiting signal, the signal processing circuit masks the first pulse of the rotation detecting signal Sa after the change of the rotational direction and generates a first output signal OUT1. Based on the first output signal OUT1 and the reverse signal REV, the signal processing circuit generates a second output signal OUT2 that transitions between a high level (H) and a low level (L) while the rotor rotates in the normal direction and transitions between the high level (H) and a middle level (M) while the rotor rotates in the reverse direction.

However, when the first pulse of the rotation detecting signal Sa after the change of the rotational direction is masked, it may be difficult to detect a rotational motion of the rotor with accuracy based on the second output signal OUT2.

For example, in a case where the rotational direction of the rotor is changed with a short period, if the first pulse of the rotation detecting signal Sa after a change of the rotational direction is masked, the second output signal OUT2 does not change while the rotational direction of the rotor is successively changed. Thus, when the rotational direction of the rotor is successively changed, the signal processing circuit is difficult to detect the rotational motion of the rotor with accuracy.

SUMMARY OF THE INVENTION

In view of the foregoing problems, it is an object of the present invention to provide a signal processing circuit for a rotation detector, and the signal processing circuit can restrict a lack of output pulse when a rotating object rotates in one direction and can restrict an output of unnecessary pulse when a rotational direction of the rotating object is successively changed with a short period.

A signal processing circuit according to an aspect of the present invention is for a rotation detector that includes a first magnetic sensor and a second magnetic sensor. The first magnetic sensor and the second magnetic sensor are arranged opposite a rotating object having gear teeth. The first magnetic sensor and the second magnetic sensor respectively output a first sensor signal and a second sensor signal in accordance with movement of top lands and bottom lands of the gear teeth when the rotating object rotates in a normal direction or a reverse direction. Each of the first sensor signal and the second sensor signal has a rectangular waveform. The first sensor signal and the second sensor signal have different phases.

The signal processing circuit includes a rotational-direction determining portion, an effective edge determining portion, a normal-rotation pulse request holding portion, a reverse-rotation pulse request holding portion, an output request signal outputting portion, a pulse outputting portion, a first resetting portion, a second resetting portion, and a waiting time switching portion.

The rotational-direction determining portion determines whether a rotational direction of the rotating object is the normal direction or the reverse direction based on a phase relationship between the first sensor signal and the second sensor signal.

The effective edge determining portion determines whether a change in the first sensor signal is caused by an effective edge. The effective edge determining portion determines that the change in the first sensor signal is caused by the effective edge when the change is caused by one of front edges of the top lands while the rotating object is rotating in one of the normal direction and the reverse direction or when the change is caused by one of rear edges of the top lands while the rotating object is rotating in the other one of the normal direction and the reverse direction.

The normal-rotation pulse request holding portion holds an output request signal of a normal-rotation pulse when the rotational-direction determining portion determines that the rotational direction is the normal direction and the effective edge determining portion determines that the change in the first sensor signal is caused by the effective edge. The normal-rotation pulse indicates that the rotating object is rotating in the normal direction.

The reverse-rotation pulse request holding portion holds an output request signal of a reverse-rotation pulse when the rotational-direction determining portion determines that the rotational direction is the reverse direction and the effective edge determining portion determines that the change in the first sensor signal is caused by the effective edge. The reverse-rotation pulse indicates that the rotating object is rotating in the reverse direction.

When one of the normal-rotation pulse request holding portion and the reverse-rotation pulse request holding portion holds the output request signal, the output request signal outputting portion permits an output of the output request signal held by the one of the normal-rotation pulse request holding portion and the reverse-rotation pulse request holding portion. When the other one of the normal-rotation pulse request holding portion and the reverse-rotation pulse request holding portion holds the output request signal in a state where the one of the normal-rotation pulse request holding portion and the reverse-rotation pulse request holding portion holds the output request signal, the output request signal outputting portion waits an output of the output request signal held by the other one of the normal-rotation pulse request holding portion and the reverse-rotation pulse request holding portion until the output request signal held by the one of the normal-rotation pulse request holding portion and the reverse-rotation pulse request holding portion is reset.

The pulse outputting portion outputs one of the normal-rotation pulse and the reverse-rotation pulse based on the output request signal from the output request signal outputting portion.

After the pulse outputting portion ends an output of one of the normal-rotation pulse and the reverse-rotation pulse and a waiting time elapses, the first resetting portion resets the output request signal of the one of the normal-rotation pulse and the reverse-rotation pulse held by the one of the normal-rotation pulse request holding portion and the reverse-rotation pulse request holding portion;

When the other one of the normal-rotation pulse request holding portion and the reverse-rotation pulse request holding portion holds the output request signal and then a condition for holding the output request signal that is already held by the one of the normal-rotation pulse request holding portion and the reverse-rotation pulse request holding portion is satisfied in a state where the one of the normal-rotation pulse request holding portion and the reverse-rotation pulse request holding portion holds the output request signal, the second resetting portion resets the output request signal held by the other one of the normal-rotation pulse request holding portion and the reverse-rotation pulse request holding portion.

The waiting time switching portion switches the waiting time between a first waiting time and a second waiting time that is longer than the first waiting time. The waiting time switching portion sets the waiting time to the first waiting time when one of the normal-rotation pulse request holding portion and the reverse-rotation pulse request holding portion holds the output request signal. The waiting time switching portion sets the waiting time to the second waiting time when both the normal-rotation pulse request holding portion and the reverse-rotation pulse request holding portion hold the output request signals.

The signal processing circuit can restrict a lack of output pulse when the rotating object rotates in one direction and can restrict an output of unnecessary pulse when a rotational direction of the rotating object is successively changed with a short period.

BRIEF DESCRIPTION OF THE DRAWINGS

Additional objects and advantages of the present invention will be more readily apparent from the following detailed description of preferred embodiments when taken together with the accompanying drawings. In the drawings:

FIG. 7A is a timing diagram showing waveforms of signals processed in a rotation detector in a case where a waiting time is not set, and FIG. 7B is a timing diagram showing waveforms of signals processed in a rotation detector in a case where a waiting time is set;

DETAILED DESCRIPTION OF THE PREFERRED EMBODIMENTS

Figure 1:
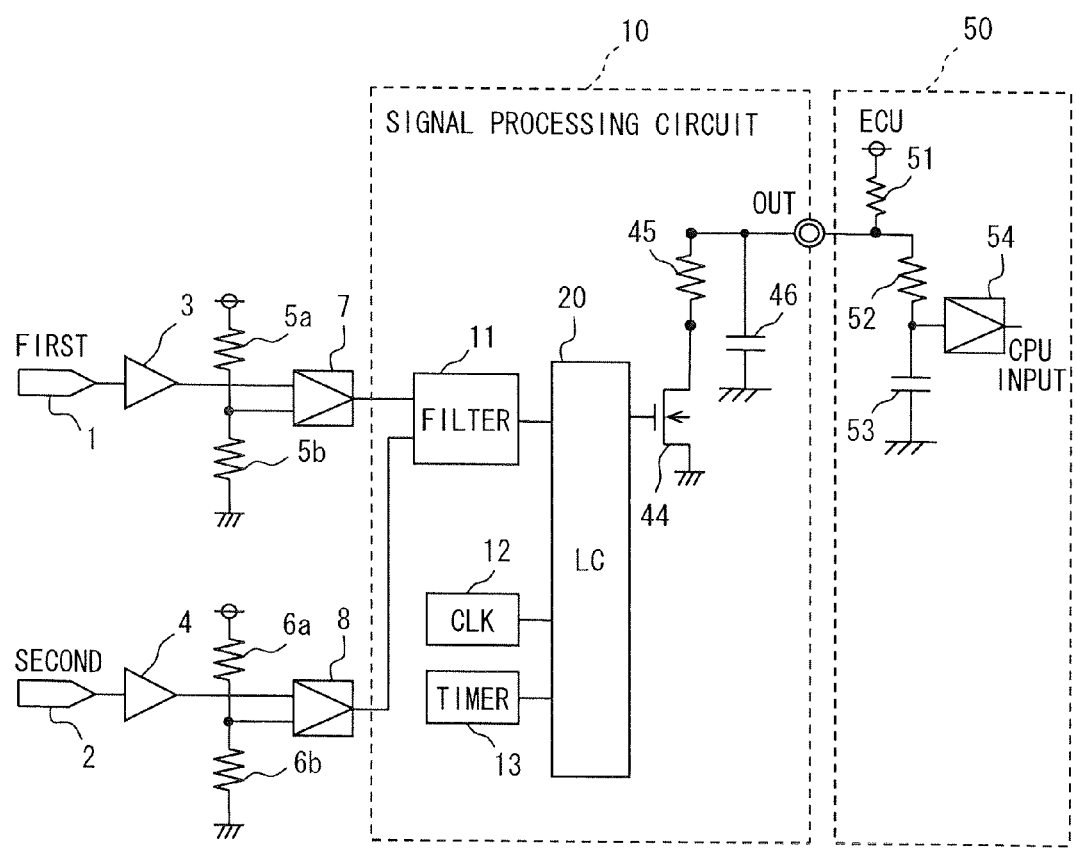
FIG. 1 is a block diagram showing a rotation detector according to a first embodiment of the present invention.

Before describing preferred embodiments of the present invention, circumstances how the inventor arrived at the present invention will be described.

In Japanese Patent Application No. 2009-122375 (corresponding to U.S. patent application Ser. No. 12/659,349), the inventor of the present invention discloses a signal processing circuit for a rotation detector. The signal processing circuit can detect a rotational motion of a rotating body and can output a detecting signal even when a rotational direction of the rotation body is successively changed with a short period.

In the signal processing circuit, when the rotating body rotates in the normal direction, changes in a first sensor signal due to front edges of top lands of gear teeth are defined as signal changes due to effective edges, and changes in the first sensor signal due to rear edges of top lands are defined as signal changes due to ineffective edges. When the rotating body rotates in the reverse direction, changes in a first sensor signal due to the rear edges of the top lands of the gear teeth are defined as signal changes due to effective edges, and changes in the first sensor signal due to the front edges of the top lands are defined as signal changes due to ineffective edges. In other words, the changes in the first sensor signal due to one side edges of the top lands are defined as the changes due to the effective edges and the changes in the first sensor signal due to the other side edges of the top lands are defined as the changes due to the ineffective edges regardless of the rotational direction of the rotor. Then, the signal processing circuit determines the rotational direction of the rotating body based on the phase relationship between the first sensor signal and the second sensor signal having different phases.

The signal processing circuit includes a normal-rotation pulse request holding circuit. The normal-rotation pulse request holding circuit holds an output request signal of a normal-rotation pulse when a detected rotational direction is the normal direction and the signal change due to the effective edge occurs in the first sensor signal. When the normal-rotation pulse request holding circuit holds the output request signal of the normal-rotation pulse, the output request signal of the normal-rotation pulse is input to a normal-rotation pulse outputting circuit through a normal-rotation output permitting circuit. Then, the normal-rotation pulse outputting circuit outputs a normal-rotation pulse based on the output request signal of the normal-rotation pulse. The signal processing circuit also includes a reverse-rotation pulse request holding circuit. The reverse-rotation pulse request holding circuit holds an output request signal of a reverse-rotation pulse when a detected rotational direction is the reverse direction and the signal change due to the effective edge occurs in the first sensor signal. When the reverse-rotation pulse request holding circuit holds the output request signal of the reverse-rotation pulse, the output request signal of the reverse-rotation pulse is input to a reverse-rotation pulse outputting circuit through a reverse-rotation output permitting circuit. Then, the reverse-rotation pulse outputting circuit outputs a reverse-rotation pulse based on the output request signal of the reverse-rotation pulse. The normal-rotation pulse and the reverse-rotation pulse are combined at an output combining circuit, and the combined signal is output as a detecting signal for detecting a rotational motion of the rotating body.

When the rotational direction of the rotating body changes from the normal direction to the reverse direction, the signal change due to the effective edge occurs in the first sensor signal, and the reverse-rotation pulse request holding circuit holds the output request signal of the reverse-rotation pulse while the normal-rotation pulse request holding circuit holds the output request signal of the normal-rotation pulse and the normal-rotation pulse outputting circuit outputs the normal-rotation pulse, the reverse-rotation output permitting circuit prohibits outputting the output request signal of the reverse-rotation pulse to the reverse-rotation pulse outputting circuit until the output of the normal-rotation pulse is finished and a waiting time elapses.

When the output of the normal-rotation pulse is finished and the waiting time elapses, the reverse-rotation output permitting circuit permits outputting the output request signal of the reverse-rotation pulse to the reverse-rotation pulse outputting circuit, and thereby the reverse-rotation pulse outputting circuit outputs the reverse-rotation pulse. Thus, even when the rotational direction of the rotating body is changed with a short period, the signal processing circuit outputs the normal-rotation pulse or the reverse-rotation pulse as the detecting signal in accordance with the rotational motion of the rotating body. Thus, the rotational motion of the rotation body can be detected based on the detecting signal including the normal-rotation pulse and the reverse-rotation pulse.

The signal processing circuit further includes a first rotational-direction change determining circuit and a second rotational-direction change determining circuit. The first rotational-direction change determining circuit determines that the rotational direction of the rotating body changes even number of times from the normal direction to the reverse direction and from the reverse direction to the normal direction while the normal-rotation pulse is output and that the signal changes due to the effective edge occur in the first sensor signal. The second rotational-direction change determining circuit determines that the rotational direction of the rotating body changes even number of times from the reverse direction to the normal direction and from the normal direction to the reverse direction while the reverse-rotation pulse is output and that the signal changes due to the effective edge occur in the first sensor signal. When the first rotational-direction change determining circuit or the second rotational-direction change determining circuit determines that the rotational direction changes even number of times, regardless of the signal change in the first sensor signal due to the effective edge, a waiting output request signal is reset, and both of the normal-rotation pulse and the reverse-rotation pulse are not output. This is because when the rotational direction changes even number of times, for example, while the normal-rotation pulse is output, the normal-rotation pulse output from the signal processing circuit corresponds to the rotational direction of the rotating body. If the reverse-rotation pulse is output after the normal-rotation pulse is output because the rotating body once rotates in the reverse direction, a time lag is generated between the actual rotational motion of the rotating body and the detecting signal, and the normal-rotation pulse or the reverse-rotation pulse which should be output thereafter may also delay.

In the signal processing circuit, an output time, that is, a pulse width of the normal-rotation pulse is set to be different from a pulse width of the reverse-rotation pulse so that the rotational direction of the rotating body can be detected based on the normal-rotation pulse and the reverse-rotation pulse. For example, the pulse width of the normal-rotation pulse is less than the pulse width of the reverse-rotation pulse. Furthermore, in the signal processing circuit, an adjusting time (waiting time) for securing an interval between successive pulses is provided after the normal-rotation pulse or the reverse-rotation pulse is output. The output request signal of the normal-rotation pulse held by the normal-rotation pulse request holding circuit or the output request signal of the reverse-rotation pulse held by the reverse-rotation pulse request holding circuit is not reset just after the output of the normal-rotation pulse or the reverse-rotation pulse is finished and is reset after elapse of the waiting time. Accordingly, even when the rotation pulse signal and the reverse-rotation pulse are successively output, the pulse signals in the detecting signal can be identified by a device for detecting the rotation of the rotating body based on the detecting signal.

As described above, the output request signal of the normal-rotation pulse held by the normal-rotation pulse request holding circuit or the output request signal of the reverse-rotation pulse held by the reverse-rotation pulse request holding circuit is reset when the waiting time elapses after the output of the normal-rotation pulse or the reverse-rotation pulse is finished. Thus, even when the output request signal of a pulse signal different from a pulse signal being output is generated during the pulse output time and the waiting time, the output request signal is only held by the normal-rotation pulse request holding circuit or the reverse-rotation pulse request holding circuit. Furthermore, when it is determined that the rotational direction is changed even number of times during the pulse output time and the waiting time, the output request signals of the normal-rotation pulse and the reverse-rotation pulse are reset.

In a case where a rotating body rotates in one direction at a high speed, signal changes in the first sensor signal are generated with a short period due to effective edges, and the signal processing circuit of the rotation detector is required to certainly hold the output request signal of the normal-rotation pulse or the reverse-rotation pulse based on the signal changes at a corresponding pulse request holding circuit. If the output request signal cannot be held, a corresponding pulse signal is not output as the detecting signal, and the pulse signal is lacked.

If a condition for holding the output request signal of the normal-rotation pulse is newly satisfied in a state where the normal-rotation pulse request holding circuit holds the output request signal of the normal-rotation pulse, the normal-rotation pulse request holding circuit cannot hold a new output request signal of the normal-rotation pulse because it is required to maintain the normal-rotation pulse being output and to secure the waiting time. Thus, the total time of the pulse output time and the waiting time is limited to be less than intervals of the signal change in the first sensor signal due to the effective edges when the rotating body rotates at the maximum speed, that is, a time between the effective edges when the rotating body rotates at the maximum speed.

In a case where the waiting time is set based on the above-described limitation, an unnecessary pulse signal may be output as the detecting signal when the rotational direction of the rotating body is successively changed with a short period or when a sensor signal indicating that the rotational direction of the rotating body is successively changed with a short period is generated due to noise. For example, a case where the output request signal of the reverse-rotation pulse is held and then a condition for holding the normal-rotation pulse request signal is satisfied while the normal-rotation pulse is being output is considered. If the condition for holding the output request signal of the normal-rotation pulse is satisfied in a relatively short time after the output request signal of the reverse-rotation pulse is held, it is preferred that the reverse-rotation pulse request signal is reset and neither the reverse-rotation pulse nor the normal-rotation pulse is output. However, in a case where the predetermined waiting time is short, even if the condition for holding the output pulse request signal of the normal-rotation pulse is satisfied in a relatively short time after the output request signal of the reverse-rotation pulse is held, the waiting time may elapse before the condition for holding the output request signal of the normal-rotation pulse is satisfied, and the reverse-rotation pulse may be output as the detecting signal.

In view of the foregoing problems, it is an object of the present invention to provide a signal processing circuit for a rotation detector, the signal processing circuit can restrict a lack of an output pulse when a rotating body rotates in one direction and can restrict an output of an unnecessary pulse when a rotational direction of the rotating body is successively changed with a short period.

First Embodiment

A rotation detector according to a first embodiment of the present invention will be described with reference to FIG. 1.

The rotation detector includes a first magnetic sensor 1 and a second magnetic sensor 2. Each of the first magnetic sensor 1 and the second magnetic sensor 2 includes a magnetoelectric transducer such as a magnetoresistance element and a hole element. The first magnetic sensor 1 and the second magnetic sensor 2 have a predetermined distance therebetween and are opposite an outer peripheral surface of a rotor (not shown). The rotor is made of a magnetic material, and gear teeth are formed at an outer periphery. Thus, when the rotor rotates, the first magnetic sensor 1 and the second magnetic sensor 2 output periodical signals having different phases (for example, ¼ cycle).

When the rotor rotates, top lands and bottom lands of the gear teeth alternately pass in the vicinities of the first magnetic sensor 1 and the second magnetic sensor 2. Thus, magnetic fields applied to the magnetoelectric transducers in the first magnetic sensor 1 and the second magnetic sensor 2 periodically change. The changes in the magnetic fields are converted into electric signals by the magnetoelectric transducers in the first magnetic sensor 1 and the second magnetic sensor 2. After the electric signals are respectively amplified by amplifiers 3 and 4, the electric signals are respectively input to comparators 7 and 8. The comparators 7 and 8 respectively binarize the amplified electric signals by comparing with reference voltages generated by resistors 5a, 5b and resistors 6a, 6b.

Thus, with the above-described configuration, the first magnetic sensor 1 and the second magnetic sensor 2 can provide a first sensor signal and a second sensor signal, respectively. Each of the first sensor signal and the second sensor signal has a rectangular wave shape that changes with a passage of the top lands and the bottom lands of the gear teeth of the rotor. The sensor signals are input to a signal processing circuit 10.

The signal processing circuit 10 generates a detecting signal for detecting a rotational position and a rotational direction of the rotor based on the first sensor signal and the second sensor signal and outputs the detecting signal. The signal processing circuit 10 includes a filter 11, a clock signal generator 12, a timer 13, a logic circuit 20, a transistor 44, a protective resistor 45, and a capacitor 46.

The filter 11 removes high frequency components in the first sensor signal and the second sensor signal input to the signal processing circuit 10. Thus, the logic circuit 20 receives the first sensor signal and the second sensor signal from which the high frequency components are removed by the filter 11.

In the present embodiment, a concept of an effective edge and an ineffective edge is introduced to the changes in the first sensor signal. In one rotational direction of a normal direction and a reverse direction of the rotor, the changes in the first sensor signal due to front edges of the top lands are defined as effective edges in the one rotational direction, and the changes in the first sensor signal due to rear edges of the top lands are defined as ineffective edges in the one rotational direction. In addition, in the other rotational direction of the normal direction and the reverse direction of the rotor, the changes in the first sensor signal due to the rear edges of the top lands are defined as effective edges in the other rotational direction, and the changes in the first sensor signal due to the front edges of the top lands are defined as ineffective edges in the other rotational direction. Thus, the changes in the first sensor signal due to one side edges of the top lands are defined as the changes due to the effective edges and the changes in the first sensor signal due to the other side edges of the top lands are defined as the changes due to the ineffective edges regardless of the rotational direction of the rotor.

When the change in the first sensor signal due to the effective edge occurs while the rotor rotates in the normal direction, the logic circuit 20 generates normal-rotation pulses. When the change in the first sensor signal due to the effective edge occurs while the rotor rotates in the reverse direction, the logic circuit 20 generates reverse-rotation pulse. The logic circuit 20 generates output signals (detecting signals) by combining the normal-rotation pulse and the reverse-rotation pulse. The logic circuit 20 is coupled with a base of the transistor 44. The output signal of the logic circuit 20 is output from an output terminal OUT through the transistor 44, the resistor 45, and the capacitor 46.

An electric control unit (ECU) 50 receives the detecting signal for detecting the rotational motion of the rotor. The ECU 50 includes an ECU filter including a resistor 52 and a capacitor 53. The ECU filter removes noise in the detecting signal, and the detecting signal is input to a comparator 54. The comparator 54 compares the detecting signal with two reference voltages and binaries the detecting signal. The two reference voltages are determined by providing hysteresis at a rising edge and a falling edge. The binarized detecting signal is input to a central processing unit (CPU) in the ECU 50.

The signal processing circuit 10 sets the normal-rotation pulses and the reverse-rotation pulses to have different pulse widths. For example, the pulse width of the normal-rotation pulses is set to be 45 μs and the pulse width of the reverse-rotation pulses is set to be 180 μs. Because the pulse widths of the pulse signals differ according to the rotational direction, the ECU 50 can detect the rotational direction of the rotor as well as a rotational speed of the rotator based on the detecting signal.

Next, the changes in the first sensor signal due to the effective edges and the changes in the first sensor signal due to the ineffective edges will be described with reference to FIG. 2 and FIG. 3.

Figures 2, 3:
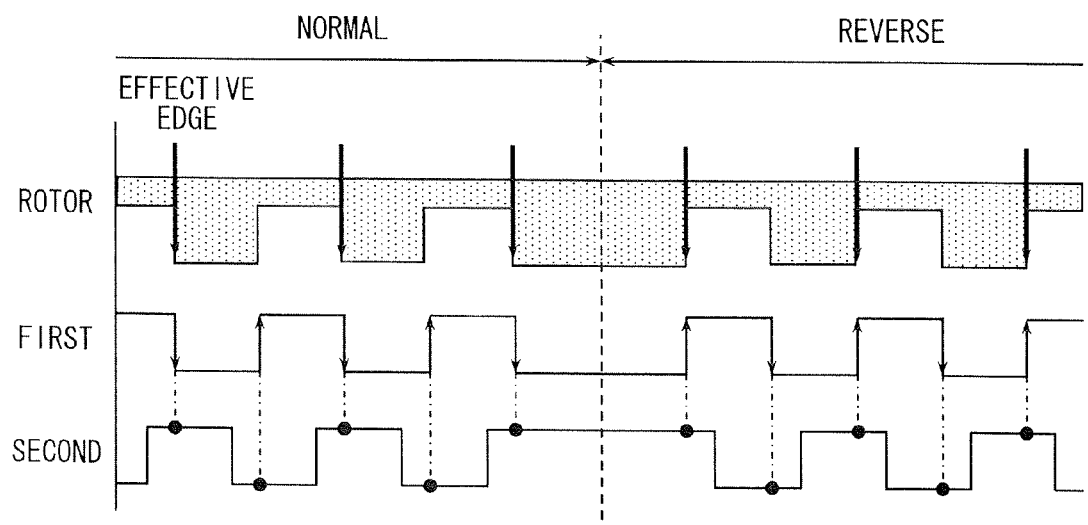
FIG. 2 is a diagram showing a relationship among changes in a first sensor signal and a second sensor signal caused by top lands and bottom lands of gear teeth of a rotor and an effective edge and an ineffective edge.
FIG. 3 is a diagram showing the relationship among the changes in the first sensor signal and the second sensor signal and the effective edge and the ineffective edge.

In an example shown in FIG. 2, when the rotor rotates in the normal direction, the changes in the first sensor signal due to the front edges of the top lands of the gear teeth are defined as the signal changes due to the effective edges, and the changes in the first sensor signal due to the rear edges of the top lands are defined as the signal changes due to the ineffective edges. In the present case, as shown in FIG. 3, falling edges of the first sensor signal become the signal changes due to the effective edges and rising edges of the first sensor signal become the signal changes due to the ineffective edges. When the rotor rotates in the reverse direction, the changes in the first sensor signal due to the rear edges of the top lands of the gear teeth are defined as the signal changes due to the effective edges, and the changes in the first sensor signal due to the front edges of the top lands are defined as the signal changes due to the ineffective edges. In the present case, rising edges of the first sensor signal become the signal changes due to the effective edges and falling edges of the first sensor signal become the signal changes due to the ineffective edges.

As described above, when the rotor rotates in the normal direction, the changes in the first sensor signal due to the front edges of the top lands are defined as the signal changes due to the effective edges. When the rotor rotates in the reverse direction, the changes in the first sensor signal due to the rear edges of the top lands are defined as the signal changes due to the effective edges. Thus, the changes in the first sensor signal due to one-side edges of the top lands become the signal changes due to the effective edges regardless of the rotational direction of the rotor.

The logic circuit 20 can determine whether the rotor rotates in the normal direction or the reverse direction based on a phase relationship between the first sensor signal and the second sensor signal. In the example shown in FIG. 2, when the rotor rotates in the normal direction, the phase of the first sensor signal is ahead of the phase of the second sensor signal. Thus, when the first sensor signal falls, the second sensor signal transitions to a high level, and when the first sensor signal rises, the second sensor signal transitions to a low level. In contrast, when the rotor rotates in the reverse direction, the phase of the second sensor signal is ahead of the phase of the first sensor signal. Thus, when the first sensor signal rises, the second sensor signal transitions to a high level, and when the first sensor signal falls, the second sensor signal transitions to a low level. The logic circuit 20 can determine whether the rotor rotates in the normal direction or the reverse direction based on the level of the second sensor signal at a time when the first sensor signal rises or falls.

The above-described relationships are shown in FIG. 3. The relationship between the effective edge and the ineffective edge may also be reversed. That is, when the rotor rotates in the normal direction, the changes in the first sensor signal due to the rear edges of the top lands may also be defined as the signal changes due to the effective edge and the changes in the first sensor signal due to the front edges of the top lands may also be defined as the signal changes due to the ineffective edges.

An exemplary configuration and exemplary operation of the logic circuit 20 will be described with reference to FIG. 4 to FIG. 6.

Figure 4:
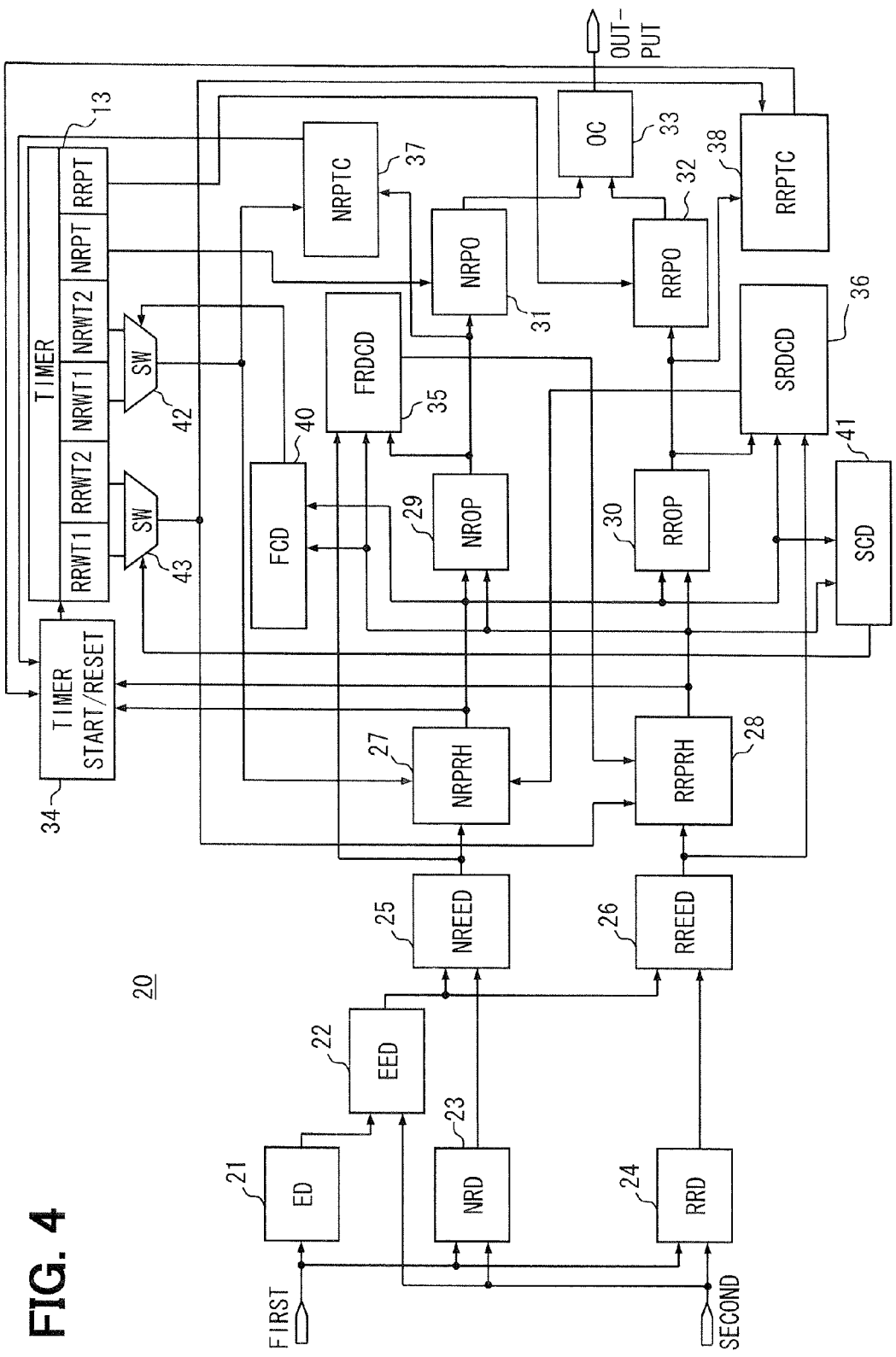
FIG. 4 is a block diagram showing a logic circuit according to the first embodiment.

As shown in FIG. 4, the first sensor signal is input to an edge detecting circuit (ED) 21. The edge detecting circuit 21 detects the rising edges and the falling edges of the first sensor signal due to the front edges and the rear edges of the top lands of the gear teeth and outputs an edge detecting signal. The edge detecting signal and the second sensor signal are input to an effective edge determining circuit (EED) 22.

Figure 5:
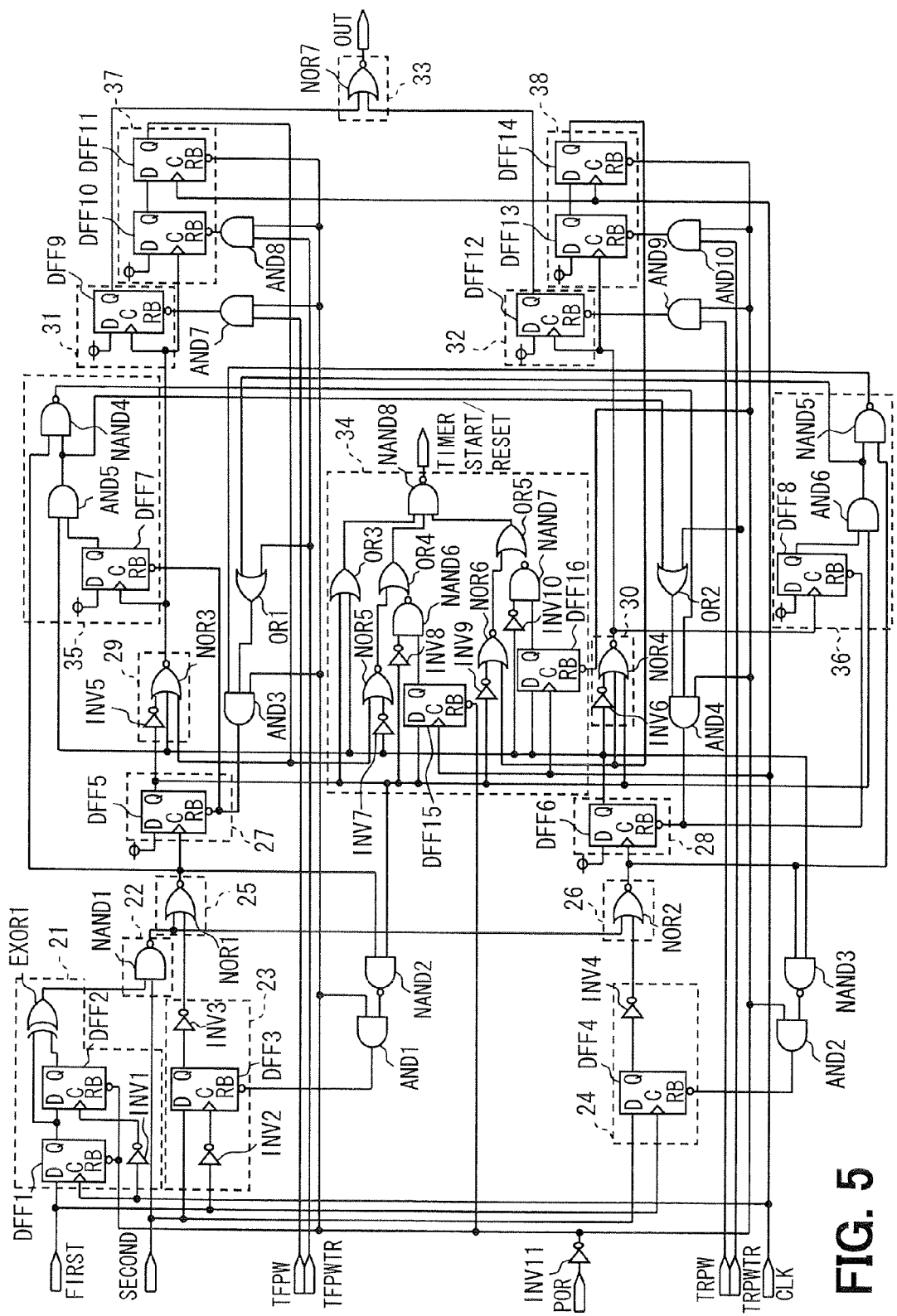
FIG. 5 is a circuit diagram showing the logic circuit according to the first embodiment.

As shown in FIG. 5, the edge detecting circuit 21 includes DFF1, DFF2, EXOR1, and INV1, where DFF means a delayed flip flop circuit, EXOR means an exclusive-OR circuit, and INV means an inverter. The first sensor signal is input to a data input terminal of the DFF1, and the DFF1 outputs an output signal from a data output terminal. The output signal from the DFF1 is input to a data input terminal of the DFF2. Clock signals from the clock signal generator 12 are input to the clock terminals of the DFF1 and the DFF2. A phase of the clock signal of the DFF1 and a phase of the clock signal of the DFF2 are inverted by the INV1. The clock signals have a frequency of, for example, a few MHz. The frequency of the clock signals are set to be sufficiently higher than frequencies of the first sensor signal and the second sensor signal which are about 10 kHz at the maximum.

When the first sensor signal rises or falls, the output signal of the DFF1 changes first. Then, the output signal of the DFF2 changes after one clock delay. Because the output signal of the DFF1 and the output signal of the DFF2 are different for one clock when the first sensor rises or falls, the EXOR1 outputs an edge detecting signal at the high level.

When the edge detecting signal from the edge detecting circuit 21 is input, the effective edge determining circuit 22 determines whether the change in the first sensor signal is caused by the effective edge or the ineffective edge based on the level of the second sensor signal which is input at the same time. When the effective edge determining circuit 22 determines that the signal change is caused by the effective edge, the effective edge determining circuit 22 outputs an effective edge signal. As shown in FIG. 5, the effective edge determining circuit 22 includes NAND1, where NAND means a NAND circuit. When the edge detecting signal at the high level is input, the effective edge determining circuit 22 outputs the effective edge signal at the low level only when the second sensor signal is at the high level.

Each of a normal-rotation determining circuit (NRD) 23 and a reverse-rotation determining circuit (RRD) 24 receives the first sensor signal and the second sensor signal and determines the rotational direction of the rotor based on the phase relationship between the first sensor signal and the second sensor signal. When the normal-rotation determining circuit 23 determines that the rotor rotates in the normal direction, the normal-rotation determining circuit 23 outputs a normal-rotation pulse. When the reverse-rotation determining circuit 24 determines that the rotor rotates in the reverse direction, the reverse-rotation determining circuit 24 outputs a reverse-rotation pulse.

As shown in FIG. 5, the normal-rotation determining circuit includes INV2, INV3, and DFF3. The reverse-rotation determining circuit 24 includes INV4 and DFF4. The first sensor signal is input to a clock terminal of the DFF3 through the INV2. The first sensor signal is also input to a clock terminal of the DFF4. The second sensor signal is input to data input terminals of the DFF3 and the DFF4. The INV3 and the INV4 are coupled to output terminals of the DFF3 and the DFF4 respectively.

As described above, the first sensor signal is input to the clock terminal of the DFF3 through the INV2. Thus, when the first sensor signal falls, the DFF3 reads the level of the second sensor signal input to the data input terminal and outputs a signal at the read level from the output terminal. As shown in FIG. 3, when the rotor rotates in the normal direction, the second sensor signal is at the high level at a time when the first sensor signal falls. When the rotor rotates in the reverse direction, the second sensor signal is at the low level at a time when the first sensor signal falls. Thus, when the rotor rotates in the normal direction, the high level signal output from the DFF3 is inverted to a normal-rotation pulse at the low level by the INV3, and when the rotor rotates in the reverse direction, the low level signal output from the DFF3 is inverted to a non-normal-rotation pulse at the high level by the INV3.

The first sensor signal is also input to the clock terminal of the DFF4 directly. Thus, when the first sensor signal rises, the DFF4 reads the level of the second sensor signal input to the data input terminal and outputs a signal at the read level from the output terminal. Thus, contrary to the normal-rotation determining circuit 23, when the rotor rotates in the reverse direction, the high level signal output from the DFF4 is inverted to a reverse-rotation pulse at the low level by the INV4, and when the rotor rotates in the normal direction, the low level signal output from the DFF4 is inverted to a non-reverse-rotation pulse at the high level by the INV4.

In the logic circuit 20 shown in FIG. 4, when a normal-rotation effective edge determining circuit (NREED) 25 receives the effective edge signal from the effective edge determining circuit 22 while the normal-rotation pulse is input from the normal-rotation determining circuit 23 to the normal-rotation effective edge determining circuit 25, the normal-rotation effective edge determining circuit 25 determines that the signal change caused by the effective edge occurs in the first sensor signal in a state where the rotor rotates in the normal direction and outputs the output request signal of the normal-rotation pulse. The output request signal of the normal-rotation pulse is input to a normal-rotation pulse request holding circuit (NRPRH) 27. As shown in FIG. 5, the normal-rotation effective edge determining circuit 25 includes NOR1, where NOR means a NOR circuit. When the effective edge signal at the low level is input from the effective edge determining circuit 22 and the normal-rotation pulse at the low level is input from the normal-rotation determining circuit 23, the normal-rotation effective edge determining circuit 25 generates the normal-rotation pulse output request signal at the high level. Thus, the output level of the normal-rotation effective edge determining circuit 25 transitions from the low level to the high level.

The normal-rotation pulse request holding circuit 27 holds the output request signal of the normal-rotation pulse generated by the normal-rotation effective edge determining circuit 25. The normal-rotation pulse request holding circuit 27 includes DFF5 as shown in FIG. 5. The output signal from the normal-rotation effective edge determining circuit 25 is input to a clock terminal of the DFF5. A data input terminal of the DFF5 is coupled with a pull-up power source. Thus, when the level of the output signal from the normal-rotation effective edge determining circuit 25 transitions from the low level to the high level, the DFF5 outputs a signal at the high level, that is, the output request signal of the normal-rotation pulse from a data output terminal. The DFF5 holds the output request signal of the normal-rotation pulse until a reset signal at the low level is input to a reset terminal of the DFF5.

As shown in FIG. 5, the output signal from the normal-rotation effective edge determining circuit 25 and the output signal from the normal-rotation pulse request holding circuit 27 are input to NAND2. An output signal from the NAND2 is input to a reset terminal of the DFF3 in the normal-rotation determining circuit 23 through AND1, where AND means an AND circuit. Thus, at a time when both the normal-rotation effective edge determining circuit 25 and the normal-rotation pulse request holding circuit 27 output the normal-rotation pulse output request signal at the high level, an output signal of the NAND2 transitions to the low level and the DFF3 is reset. The other input signal of the AND1 is a power on reset (POR) signal.

In the logic circuit 20 shown in FIG. 4, when a reverse-rotation effective edge determining circuit (RREED) 26 receives the effective edge signal from the effective edge determining circuit 22 while the reverse-rotation pulse is input from the reverse-rotation determining circuit 24 to the reverse-rotation effective edge determining circuit 26, the reverse-rotation effective edge determining circuit 26 determines that the signal change caused by the effective edge occurs in the first sensor signal in a state where the rotor rotates in the reverse direction and outputs an output request signal of the reverse-rotation pulse. The output request signal of the reverse-rotation pulse is input to a reverse-rotation pulse request holding circuit (RRPRH) 28. The reverse-rotation effective edge determining circuit 26 includes NOR2 as shown in FIG. 5. When the effective edge signal at the low level is input from the effective edge determining circuit 22 and the reverse-rotation pulse at the low level is input from the reverse-rotation determining circuit 24, the reverse-rotation effective edge determining circuit 26 generates the reverse-rotation pulse output request signal at the high level.

The reverse-rotation pulse request holding circuit 28 holds the output request signal of the reverse-rotation pulse generated by the reverse-rotation effective edge determining circuit 26. The reverse-rotation pulse request holding circuit 28 includes DFF6 as shown in FIG. 5. The output signal from the reverse-rotation effective edge determining circuit 26 is input to a clock terminal of the DFF6. A data input terminal of the DFF6 is coupled with a pull-up power source. Thus, when the level of the output signal from the reverse-rotation effective edge determining circuit 26 transitions from the low level to the high level, the DFF6 outputs a signal at the high level, that is, the output request signal of the reverse-rotation pulse from a data output terminal. The DFF6 holds the output request signal of the reverse-rotation pulse until a reset signal at the low level is input to a reset terminal of the DFF6.

In a manner similar to the normal-rotation determining circuit 23, the output signal from the reverse-rotation effective edge determining circuit 26 and the output signal from the reverse-rotation pulse request holding circuit 28 are input to NAND3. An output signal from the NAND3 is input to a reset terminal of the DFF4 in the reverse-rotation determining circuit 24 through AND2. Thus, at a time when both the reverse-rotation effective edge determining circuit 26 and the reverse-rotation pulse request holding circuit 28 output the reverse-rotation pulse output request signals at the high level, the DFF4 is reset.

As shown in FIG. 4, when the normal-rotation pulse request holding circuit 27 holds the normal-rotation pulse output request signal, the normal-rotation pulse request holding circuit 27 outputs the holding output request signal to a normal-rotation output permitting circuit (NROP) 29 and a reverse-rotation output permitting circuit (RROP) 30. The reverse-rotation pulse output request signal is also input to the normal-rotation output permitting circuit 29 when the reverse-rotation pulse request holding circuit 28 holds the reverse-rotation pulse output request signal. When the normal-rotation pulse output request signal is input to the normal-rotation output permitting circuit 29 while the reverse-rotation pulse output request signal is not being input, the normal-rotation output permitting circuit 29 permits outputting the normal-rotation pulse output request signal to the subsequent circuit. When the normal-rotation pulse output request signal is input to the normal-rotation output permitting circuit 29 while the reverse-rotation pulse output request signal is being input, the normal-rotation output permitting circuit 29 waits outputting the normal-rotation pulse output request signal until holding the reverse-rotation pulse output request signal at the reverse-rotation pulse request holding circuit 28 is reset and inputting the reverse-rotation pulse output request signal is finished.

As shown in FIG. 5, the normal-rotation output permitting circuit 29 includes INV5 and NOR3. The output signal from the normal-rotation pulse request holding circuit 27 is input to the NOR3 through the INV5. The output signal from the reverse-rotation pulse request holding circuit 28 and an output signal from a normal pulse timing control circuit (NRPTC) 37 are also input to the NOR3. Before the output of the normal-rotation pulse is started, the normal-rotation pulse timing control circuit 37 outputs a signal at the low level. When the output of the normal-rotation pulse is started, the normal-rotation pulse timing control circuit 37 outputs a signal at the high level. Thus, the NOR3 permits outputting the normal-rotation pulse output request signal at the high level when the normal-rotation pulse request holding circuit 27 holds the normal-rotation pulse output request signal at the high level, the reverse-rotation pulse request holding circuit 28 does not hold the reverse-rotation pulse output request signal at the high level, and the normal-rotation pulse timing control circuit 37 outputs the signal at the low level. When the reverse-rotation pulse request holding circuit 28 holds the reverse-rotation pulse output request signal at the high level, the NOR3 waits outputting the normal-rotation pulse output request signal until the reverse-rotation pulse output request signal is reset. When the normal-rotation pulse is actually output based on an output permission of the normal-rotation pulse output request signal, the normal-rotation pulse timing control circuit 37 starts outputting the signal at the high level. Thus, the normal-rotation output permitting circuit 29 prohibits outputting the normal-rotation pulse output request signal until the output of the normal-rotation pulse is finished and a predetermined waiting time elapses.

When the reverse-rotation pulse request holding circuit 28 holds the reverse-rotation pulse output request signal, the reverse-rotation pulse request holding circuit 28 outputs the holding output request signal to the normal-rotation output permitting circuit 29 and the reverse-rotation output permitting circuit 30. When the reverse-rotation pulse output request signal is input to the reverse-rotation output permitting circuit 30 while the normal-rotation pulse output request signal is not being input, the reverse-rotation output permitting circuit 30 permits outputting the reverse-rotation pulse output request signal to the subsequent circuit. When the reverse-rotation pulse output request signal is input to the reverse-rotation output permitting circuit 30 while the normal-rotation pulse output request signal is being input, the reverse-rotation output permitting circuit 30 waits outputting the reverse-rotation pulse output request signal until holding the normal-rotation pulse output request signal at the normal-rotation pulse request holding circuit 27 is reset and inputting the normal-rotation pulse output request signal is finished.

As shown in FIG. 5, the reverse-rotation output permitting circuit 30 includes INV6 and NOR4. The output signal from the reverse-rotation pulse request holding circuit 28 is input to the NOR4 through the INV6. The output signal from the normal-rotation pulse request holding circuit 27 and an output signal from a reverse-rotation pulse timing control circuit (RRPTC) 38 are also input to the NOR4. Before the output of the reverse-rotation pulse is started, the reverse-rotation pulse timing control circuit 38 outputs a signal at the low level. When the output of the reverse-rotation pulse is started, the reverse-rotation pulse timing control circuit 38 outputs a signal at the high level. Thus, the NOR4 permits outputting the reverse-rotation pulse output request signal at the high level when the normal-rotation pulse request holding circuit 27 does not hold the normal-rotation pulse output request signal at the high level, the reverse-rotation pulse request holding circuit 28 holds the reverse-rotation pulse output request signal at the high level, and the reverse-rotation pulse timing control circuit 38 outputs the signal at the low level. When the normal-rotation pulse request holding circuit 27 holds the normal-rotation pulse output request signal at the high level, the reverse-rotation output permitting circuit 30 waits outputting the reverse-rotation pulse output request signal until the normal-rotation pulse output request signal is reset. When the reverse-rotation pulse is actually output based on an output permission of the reverse-rotation pulse output request signal, the reverse-rotation pulse timing control circuit 38 starts outputting the signal at the high level. Thus, the reverse-rotation output permitting circuit 30 prohibits outputting the reverse-rotation pulse output request signal until the output of the reverse-rotation pulse is finished and a predetermined waiting time elapses.

When the normal-rotation output permitting circuit 29 permits outputting the normal-rotation pulse output request signal, the normal-rotation pulse output request signal is input to a normal-rotation pulse outputting circuit (NRPO) 31. The normal-rotation pulse outputting circuit 31 includes DFF9 as shown in FIG. 5. The output signal from the normal-rotation output permitting circuit 29 is input to a clock terminal of the DFF9. A data input terminal is coupled with a pull-up power source. Thus, when the normal-rotation pulse output request signal is output from the normal-rotation output permitting circuit 29 and the level of the normal-rotation pulse output request signal transitions from the low level to the high level, the DFF9 outputs a signal at the high level from a data output terminal.

When the reverse-rotation output permitting circuit 30 permits outputting the reverse-rotation pulse output request signal, the reverse-rotation pulse output request signal is input to a reverse-rotation pulse outputting circuit (RRPO) 32. The reverse-rotation pulse outputting circuit 32 includes DFF12 as shown in FIG. 5. The output signal from the reverse-rotation output permitting circuit 30 is input to a clock terminal of the DFF12. A data input terminal of the DFF12 is coupled with a pull-up power source. Thus, when the reverse-rotation pulse output request signal is output from the reverse-rotation output permitting circuit 30 and the level of the reverse-rotation pulse output request signal transitions from the low level to the high level, the DFF12 outputs a signal at the high level from a data output terminal.

The output signal from the normal-rotation pulse outputting circuit 31 and the output signal from the reverse-rotation pulse outputting circuit 32 are input to an output combining circuit (OC) 33. The output combining circuit 33 combines the normal-rotation pulse and the reverse-rotation pulse. The output combining circuit 33 includes NOR7 as shown in FIG. 5. When a signal at the high level is input from the normal-rotation pulse outputting circuit 31, the output combining circuit 33 outputs the normal-rotation pulse at the low level. When a signal at the high level is input from the reverse-rotation pulse outputting circuit 32, the output combining circuit 33 outputs the reverse-rotation pulse at the low level.

As described above, the pulse width of the normal-rotation pulse is different from the pulse width of the reverse-rotation pulse. The pulse width of the normal-rotation pulse and the pulse width of the reverse-rotation pulse are controlled using a count function of the timer 13.

As shown in FIG. 4, the normal-rotation pulse request holding circuit 27 and the reverse-rotation pulse request holding circuit 28 respectively output the normal-rotation pulse output request signal and the reverse-rotation pulse output request signal to a timer start/reset circuit 34. When one of the normal-rotation pulse output request signal and the reverse-rotation pulse output request signal is input, the timer start/reset circuit 34 outputs a start signal to the timer 13 so that the timer 13 starts to count.

The timer start/reset circuit 34 includes OR3, where OR means an OR circuit. The output signals from the normal-rotation pulse request holding circuit 27 and the reverse-rotation pulse request holding circuit 28 are input to the OR3. When one of the normal-rotation pulse request holding circuit 27 and the reverse-rotation pulse request holding circuit 28 holds the output request signal, the OR3 outputs a signal at the high level. The timer start/reset circuit 34 also includes NAND8 for outputting the start signal or a reset signal. When the OR3 outputs the signal at the high level, the output signal of the NAND8 transitions from the high level to the low level. The transition of the output signal of the NAND8 from the high level to the low level provide the start signal of the timer 13, and the timer 13 starts to count a time from when one of the normal-rotation pulse request holding circuit 27 and the reverse-rotation pulse request holding circuit 28 holds the output request signal.

In the timer 13, a normal-rotation pulse time, a reverse-rotation pulse time, and a waiting time are set. The normal-rotation pulse time corresponds to the pulse width of the normal-rotation pulse. The reverse-rotation pulse time corresponds to the pulse width of the reverse-rotation pulse. The waiting time corresponds to an adjusting time for securing intervals between successive pulses after the output of the normal-rotation pulse or the reverse-rotation pulse is finished, that is, after the normal-rotation pulse time or the reverse-rotation pulse time elapses.

A reason for setting the waiting time will be described below. As described above, the detecting signal from the signal processing circuit 10 is input to the ECU 50, and the ECU 50 includes the ECU filter including the resistor 52 and the capacitor 53. The detecting signal from the signal processing circuit 10 having a rectangular wave shape is smoothed when the detecting signal passes through the ECU filter.

Thus, as shown in FIG. 7A, in a case where the reverse-rotation effective edge (RREE) is detected after the normal-rotation effective edge (NREE) is detected and the waiting time after the normal-rotation pulse is output is not set, a signal level of the detecting signal after passing through the ECU filter at a time when the output of the normal-rotation pulse is finished may not reach a high-level determination reference voltage of the comparator 54. In such a case, a pulse lack may occur as shown in FIG. 7A. Thus, the ECU 50 has difficulty in detecting the rotational state of the rotor with accuracy.

Therefore, in the present embodiment, the waiting time is set for securing intervals of successive pulse signals. In the present case, as shown in FIG. 7B, even when the reverse-rotation effective edge (RREE) is detected after the normal-rotation effective edge (NREE) is detected, an output of the reverse-rotation pulse is delayed until the waiting time elapses after the normal-rotation pulse is output. As a result, as shown in FIG. 7B, the signal level of the detecting signal after passing through the ECU filter after the normal-rotation pulse is output certainly reaches the high-level determination reference voltage of the comparator 54. Accordingly, the ECU 50 can detect the rotational state of the rotor with accuracy based on the detecting signal.

In the present embodiment, a first normal-rotation waiting time (NRWT1), a second normal-rotation waiting time (NRWT2), a first reverse-rotation waiting time (RRWT1), and a second reverse-rotation waiting time (RRWT2) are set in the timer 13 as the waiting time. The second normal-rotation waiting time is longer than the first normal-rotation waiting time. The first normal-rotation waiting time and the second normal-rotation waiting time are set after the normal-rotation pulse is output. The second reverse-rotation waiting time is longer than the first reverse-rotation waiting time. The first reverse-rotation waiting time and the second reverse-rotation waiting time are set after the reverse-rotation pulse is output. The first and second normal-rotation waiting times and the first and second reverse-rotation waiting times are switched when the rotational direction of the rotor is successively switched with a short period or when a chattering state occurs. In the chattering state, due to noise, a sensor signal is output as if the rotational direction of the rotor is successively changed with a short period.

As described above, the normal-rotation pulse time (NRPT), the reverse-rotation pulse time (RRPT), the first normal-rotation waiting time, the second normal-rotation waiting time, the first reverse-rotation waiting time, and the second reverse-rotation waiting time are set in the timer 13. When a count time reaches the normal-rotation pulse time corresponding to the pulse width of the normal-rotation pulse, the timer 13 outputs a normal-rotation pulse reset signal (TFPW) to the normal-rotation pulse outputting circuit 31 for stopping the output of the normal-rotation pulse.

For example, the timer 13 outputs the normal-rotation pulse reset signal at the low level when the count time becomes the normal-rotation pulse time. The normal-rotation pulse reset signal is input to a reset terminal of the DFF9 through AND7. To the other input terminal of the AND7, a power on reset (POR) signal is input through an INV11. When the signal processing circuit 10 is powered on, the POR signal transitions to the low level so as to reset each of the DFFs (the actual POR signal in front of the INV11 is at the high level). However, the POR signal keeps the high level except for a time when the power source of the signal processing circuit is powered on. Thus, when the timer 13 outputs the normal-rotation pulse reset signal at the low level, the reset signal at the low level is input to the reset terminal of the DFF9, and thereby the DFF9 is reset. Then, a level of an output signal of the DFF9 transitions to the low level, and the output of the normal-rotation pulse is stopped. In the above described way, the normal-rotation pulse outputting circuit 31 outputs the normal-rotation pulse having the pulse width corresponding to the normal-rotation pulse time.

The timer 13 continues to count after outputting the normal-rotation pulse reset signal to the normal-rotation pulse outputting circuit 31. When a count time from the output of the normal-rotation pulse reset signal reaches the first normal-rotation waiting time and the second normal-rotation waiting time, the timer 13 outputs a first normal-rotation waiting time count signal (NWT1C) and a second normal-rotation waiting time count signal (NWT2C) to a switching device (SW) 42.

The switching device 42 outputs a normal-rotation waiting time reset signal (TFPWTR) for ending the waiting time after the normal-rotation pulse is output. The switching device 42 switches between a state where the normal-rotation waiting time reset signal is output when the first normal-rotation waiting time elapses and a state where the normal-rotation waiting time reset signal is output when the second normal-rotation waiting time elapses. Specifically, when the rotor rotates in the normal-direction, the switching device 42 switches a time to output the normal-rotation waiting time reset signal between a time when the first normal-rotation waiting time elapses and a time when the second normal-rotation waiting time elapses based on a signal from a first chattering determining circuit (FCD) 40 that determines a chattering state.

Even before the second normal-rotation waiting time elapses, the switching device 42 outputs the normal-rotation waiting time reset signal when the reverse-rotation pulse output request signal held by the reverse-rotation pulse request holding circuit 28 is reset by a first rotational-direction change determining circuit (FRDCD) 35 after the first normal-rotation waiting time elapses.

Detail configurations and operations of the first chattering determining circuit 40 and the switching device 42 will be described later with reference to FIG. 8.

The normal-rotation waiting time reset signal is output to the normal-rotation pulse request holding circuit 27. Accordingly, the normal-rotation pulse output request signal held by the normal-rotation pulse request holding circuit 27 is reset.

As shown in FIG. 5, the normal-rotation waiting time reset signal is input to the reset terminal of the DFF5 in the normal-rotation pulse request holding circuit 27 through OR1 and AND3. When the normal-rotation waiting time reset signal at the low level is output, the DFF5 is reset and the normal-rotation pulse output request signal held by the DFF5 is released. Accordingly, when the reverse-rotation pulse request holding circuit 28 holds the reverse-rotation pulse output request signal, the reverse-rotation output permitting circuit 30 permits outputting the reverse-rotation pulse output request signal to the subsequent circuits.

The OR1 also receives an output signal from AND6 in a second rotational-direction change determining circuit (SRDCD) 36. The AND6 outputs a signal at the high level when the DFF5 holds the normal-rotation pulse output request signal after the reverse-rotation output permitting circuit 30 permits outputting the reverse-rotation pulse output request signal. By inputting the output signal of the AND6 to the OR1, the DFF5 is prevented from being reset by the normal-rotation waiting time reset signal when the DFF5 holds the normal-rotation pulse output request signal and waits for an end of the output of the reverse-rotation pulse.

The normal-rotation waiting time reset signal is also input to the normal-rotation pulse timing control circuit 37. The normal-rotation pulse timing control circuit 37 and the normal-rotation pulse outputting circuit 31 receive the normal-rotation pulse output request signal from the normal-rotation output permitting circuit 29. When the normal-rotation pulse timing control circuit 37 receives the normal-rotation waiting time reset signal after the normal-rotation pulse output request signal is input, the normal-rotation pulse timing control circuit 37 outputs a timer reset signal to the timer start/reset circuit 34 so as to stop the counting operation of the timer 13.

As shown in FIG. 5, the normal-rotation pulse timing control circuit 37 includes DFF10 and DFF11 coupled in series. The normal-rotation pulse output request signal is input to a clock terminal of the DFF10. A data input terminal of the DFF10 is coupled with a pull-up power source. When the normal-rotation output permitting circuit 29 outputs the normal-rotation pulse output request signal, the DFF10 outputs a signal at the high level from a data output terminal. The data output terminal of the DFF10 is coupled with a data input terminal of the DFF11. To a clock terminal of the DFF11, a clock signal CLK is input. Thus, when the output signal of the DFF10 transitions to the high level, an output signal of the DFF1 transitions from the low level to the high level in synchronization with the clock signal CLK. As described above, when the signal at the high level is input to the NOR3 in the normal-rotation output permitting circuit 29, the normal-rotation output permitting circuit 29 prohibits outputting the normal-rotation pulse output request signal.

When the normal-rotation waiting time reset signal is input to the normal-rotation pulse timing control circuit 37, the normal-rotation waiting time reset signal is input to a reset terminal of the DFF10 through AND8. Then, the DFF10 is reset and the signal output from the data output terminal of the DFF6 transitions from the high level to the low level. Accordingly, the DFF11 outputs a signal at the low level in synchronization with the clock signal CLK. When the signal at the low level is input to the timer start/reset circuit 34, the output signal of the timer start/reset circuit 34 transitions from the low level to the high level so as to provide a reset signal of the timer 13.

The output signal of the normal pulse timing control circuit 37 is input to a input terminal of NOR5 in the timer start/reset circuit 34. To the other input terminal of the NOR5, the output signal of the reverse-rotation pulse request holding circuit 28 is input through INV7. The output signal of the normal-rotation pulse request holding circuit 27 is input to INV8 and a data input terminal of a DFF15. To a clock terminal of the DFF15, the clock signal CLK is input. Thus, the DFF15 outputs a signal at a level of the signal input to the data input terminal in synchronization with the clock signal CLK. Data output terminals of the INV8 and the DFF15 are coupled with NAND6. Thus, when the DFF5 is reset and the output signal of the DFF5 transitions from the high level to the low level, the NAND6 outputs a signal at the low level until the output signal of the DFF15 transitions to the low level in synchronization with the clock signal CLK.

At a time when the output signal of the DFF5 transitions from the high level to the low level by the normal-rotation waiting time reset signal, that is, at a time when the output signal of the DFF10 in the normal-rotation pulse timing control circuit 37 transitions from the high level to the low level, the DFF11 still outputs the signal at the high level. Thus, the output signal of the NOR5 transitions to the low level. The output signals of the NOR5 and the NOR6 are input to OR4. Thus, the OR4 outputs a signal at the low level only during a time from when the output signal of the DFF5 transitions from the high level to the low level by the normal-rotation waiting time reset signal till when the output signals of the DFF11 and the DFF15 transition to the low level in synchronization with the clock signal CLK. By the signal at the low level output from the OR4, the output signal of the NAND8 transitions from the low level to the high level. The rising signal from the low level to the high level becomes the reset signal of the timer 13 and the counting operation of the timer 13 is reset.

In the present embodiment, there is a possibility that the DFF5 in the normal-rotation pulse request holding circuit 27 is reset by the second rotational-direction change determining circuit 36 at a time other than a time when the output of the normal-rotation pulse is finished. Thus, by also using the signal from normal-rotation pulse timing control circuit 37, the reset signal of the timer 13 is output at a time when the output of the normal-rotation pulse is finished and at least the first normal-rotation waiting time elapses from the time when the output of the normal-rotation pulse is finished.

When the timer 13 is reset after the normal-rotation pulse outputting circuit 31 ends outputting the normal-rotation pulse and further at least the first normal-rotation waiting time elapses, the timer 13 can restart to count based on the output request signal from the normal-rotation pulse request holding circuit 27 or the reverse-rotation pulse request holding circuit 28.

When the count time reaches the reverse-rotation pulse time corresponding to the pulse width of the reverse-rotation pulse, the timer 13 outputs a reverse-rotation reset signal (TRPW) to the reverse-rotation pulse outputting circuit 32 so as to stop the output of the reverse-rotation pulse. Accordingly, the reverse-rotation pulse outputting circuit 32 outputs the reverse-rotation pulse having the pulse width corresponding to the reverse-rotation pulse time.

For example, the timer 13 outputs the reverse-rotation pulse reset signal at the low level when the count time becomes the reverse-rotation pulse time. The reverse-rotation pulse reset signal is input to a reset terminal of the DFF12 through AND9. The POR signal is also input to the AND9. Thus, when the timer 13 outputs the reverse-rotation pulse reset signal at the low level, the reset signal at the low level is input to the reset terminal of the DFF12, and thereby the DFF12 is reset. Then, a level of an output signal of the DFF12 transitions to the low level, and the output of the reverse-rotation pulse is stopped.

The timer 13 continues to count after outputting the reverse-rotation pulse reset signal to the reverse-rotation pulse outputting circuit 32. When a count time from the output of the reverse-rotation pulse reset signal reaches the first reverse-rotation waiting time and the second reverse-rotation waiting time, a first reverse-rotation waiting time count signal and a second reverse-rotation waiting time count signal are respectively output. The first reverse-rotation waiting time count signal and the second reverse-rotation waiting time count signal are input to a switching device 43.

The switching device 43 outputs a reverse-rotation waiting time reset signal (TRPWTR) for ending the waiting time after the reverse-rotation pulse is output. The switching device 43 switches between a state where the reverse-rotation waiting time reset signal is output when the first reverse-rotation waiting time elapses and a state where the reverse-rotation waiting time reset signal is output when the second reverse-rotation waiting time elapses. Specifically, when the rotor rotates in the reverse-direction, the switching device 43 switches a time to output the reverse-rotation waiting time reset signal between a time when the first reverse-rotation waiting time elapses and a time when the second reverse-rotation waiting time elapses based on a signal from a second chattering determining circuit (SCD) 41 that determines a chattering state.

The switching device 43 outputs the reverse-rotation waiting time reset signal when the normal-rotation pulse output request signal held by the normal-rotation pulse request holding circuit 27 is reset by the second rotational-direction change determining circuit 36 after the first reverse-rotation waiting time elapses and before the second reverse-rotation waiting time elapses.

Detail configurations and operations of the second chattering determining circuit 41 and the switching device 43 will be described later with reference to FIG. 8.

The reverse-rotation waiting time reset signal is output to the reverse-rotation pulse request holding circuit 28. Accordingly, the reverse-rotation pulse output request signal held by the reverse-rotation pulse request holding circuit 28 is reset.

As shown in FIG. 5, the reverse-rotation waiting time reset signal is input to the reset terminal of the DFF6 in the reverse-rotation pulse request holding circuit 28 through OR2 and AND4. When the timer 13 outputs the reverse-rotation waiting time reset signal at the low level, the DFF6 is reset and the holding of the reverse-rotation pulse output request-signal by the DFF6 is released. Accordingly, when the normal-rotation pulse request holding circuit 27 holds the normal-rotation pulse output request-signal, the normal-rotation output permitting circuit 29 permits outputting the normal-rotation pulse output request signal to the subsequent circuits.

The OR2 also receives an output signal from AND5 in the first rotational-direction change determining circuit 35. The AND5 outputs a signal at the high level when the DFF6 holds the reverse-rotation pulse output request-signal after the normal-rotation output permitting circuit 29 permits outputting the normal-rotation pulse output request signal. By inputting the output signal of the AND5 to the OR2, the DFF6 is prevented from being reset by the reverse-rotation waiting time reset signal when the DFF6 holds the reverse-rotation pulse output request signal and waits for an end of the output of the normal-rotation pulse.

The reverse-rotation waiting time reset signal is also input to the reverse-rotation pulse timing control circuit 38. The reverse-rotation pulse timing control circuit 38 and the reverse-rotation pulse outputting circuit 32 receive the reverse-rotation pulse output request signal from the reverse-rotation output permitting circuit 30. When the reverse-rotation pulse timing control circuit 38 receives the reverse-rotation waiting time reset signal after the reverse-rotation pulse output request signal is input, the reverse-rotation pulse timing control circuit 38 outputs a timer reset signal to the timer start/reset circuit 34 so as to stop the counting operation of the timer 13.

As shown in FIG. 5, the reverse-rotation pulse timing control circuit 38 includes DFF13 and DFF14 coupled in series. The reverse-rotation pulse output request-signal is input to a clock terminal of the DFF13. A data input terminal of the DFF13 is coupled with a pull-up power source. When the reverse-rotation output permitting circuit 30 outputs the reverse-rotation pulse output request signal, the DFF13 outputs a signal at the high level from a data output terminal. The data output terminal of the DFF13 is coupled with a data input terminal of the DFF14. To a clock terminal of the DFF14, the clock signal CLK is input. Thus, when the output signal of the DFF13 transitions to the high level, an output signal of the DFF14 transitions from the low level to the high level in synchronization with the clock signal CLK. As described above, when the signal at the high level is input to the NOR4 in the reverse-rotation output permitting circuit 30, the reverse-rotation output permitting circuit 30 prohibits outputting the reverse-rotation pulse output request signal.

When the reverse-rotation waiting time reset signal is input to the reverse-rotation pulse timing control circuit 38, the reverse-rotation waiting time reset signal is input to a reset terminal of the DFF13 through AND10. Then, the DFF13 is reset and the signal output from the data output terminal of the DFF13 transitions from the high level to the low level. Accordingly, the DFF14 outputs a signal at the low level in synchronization with the clock signal CLK. When the signal at the low level is input to the timer start/reset circuit 34, the output signal of the timer start/reset circuit 34 transitions from the low level to the high level so as to provide a reset signal of the timer 13.

The output signal of the reverse-rotation pulse timing control circuit 38 is input to an input terminal of NOR6 in the timer start/reset circuit 34. To the other input terminal of the NOR6, the output signal of the normal-rotation pulse request holding circuit 27 is input through INV9. The output signal of the reverse-rotation pulse request holding circuit 28 is input to INV10 and a data input terminal of DFF16. To a clock terminal of the DFF16, the clock signal CLK is input. Thus, the DFF16 outputs a signal at a level of the signal input to the data input terminal in synchronization with the clock signal CLK. Data output terminals of the INV10 and the DFF16 are coupled with NAND7. Thus, when the DFF6 is reset and the output signal of the DFF6 transitions from the high level to the low level, the NAND7 outputs a signal at the low level until the output signal of the DFF16 transitions to the low level in synchronization with the clock signal CLK.

At a time when the output signal of the DFF6 transitions from the high level to the low level by the reverse-rotation output reset signal, that is, at a time when the output signal of the DFF12 in the reverse-rotation pulse timing control circuit 37 transitions from the high level to the low level, the DFF14 still outputs the signal at the high level. Thus, the output signal of the NOR6 transitions to the low level. The output signals of the NOR6 and the NOR7 are input to OR5. Thus, the OR5 outputs a signal at the low level only during a time from when the output signal of the DFF6 transitions from the high level to the low level by the reverse-rotation waiting time reset signal till when the output signals of the DFF14 and the DFF16 transition to the low level in synchronization with the clock signal CLK. By the signal at the low level output from the OR5, the output signal of the NAND8 transitions from the low level to the high level. The rising signal from the low level to the high level becomes the reset signal of the timer 13 and the counting operation of the timer 13 is reset.

In the present embodiment, there is a possibility that the DFF6 in the reverse-rotation pulse request holding circuit 28 is reset by the first rotational-direction change determining circuit 35 at a time other than a time when the output of the reverse-rotation pulse is finished. Thus, by also using the signal from reverse-rotation pulse timing control circuit 38, the reset signal of the timer 13 is output at a time when the output of the reverse-rotation pulse is finished and at least the first reverse-rotation waiting time elapses from the time when the output of the reverse-rotation pulse is finished.

When the timer 13 is reset after the reverse-rotation pulse outputting circuit 32 ends outputting the reverse-rotation pulse and further at least the first reverse-rotation waiting time elapses, the timer 13 can restart to count based on the output request signal from the normal-rotation pulse request holding circuit 27 or the reverse-rotation pulse request holding circuit 28.

As described above, in the signal processing circuit 10 according to the present embodiment, when the rotational direction of the rotor is changed from the normal direction to the reverse direction while the normal-rotation pulse is being output, the change in the first sensor signal after the change of the rotational direction is not masked. In a case where the change in the first sensor signal is caused by the effective edge, the reverse-rotation pulse output request signal generated by the effective edge is held by the reverse-rotation pulse request holding circuit 28. Then, when the holding of the normal-rotation pulse output request signal by the normal-rotation pulse request holding circuit 27 is reset based on the counting operation of the timer 13, the reverse-rotation output permitting circuit 30 permits outputting the reverse-rotation pulse output request signal held by the reverse-rotation pulse request holding circuit 28 to the reverse-rotation pulse outputting circuit 32.

Thus, when the rotational direction of the rotor is changed from the normal direction to the reverse direction, the reverse-rotation pulse is output after the normal-rotation pulse. On the other hand, when the rotational direction of the rotor is changed from the reverse direction to the normal direction, the normal-rotation pulse is output after the reverse-rotation pulse. Thus, even when the rotational direction of the rotor is changed with a short period, the signal processing circuit 10 can output the detecting signal corresponding to the rotational motion of the rotor from the output combining circuit 33.

However, in a case where the following condition is satisfied, the first rotational-direction change determining circuit 35 or the second rotational-direction change determining circuit 36 resets the output request signal of one of the normal-rotation pulse and the reverse-rotation pulse that is opposite from one of the normal-rotation pulse and the reverse-rotation pulse being output.

For example, in a case where the normal-rotation pulse request holding circuit 27 holds the output request signal of the normal-rotation pulse, the reverse-rotation pulse request holding circuit 28 holds the output request signal of the reverse-rotation pulse while the normal-rotation pulse is being output, and the output request signal of the normal-rotation pulse is output from the normal-rotation effective edge determining circuit 25, the rotational direction of the rotor is changed from the normal direction to the reverse direction, and then from the reverse direction to the normal direction. In a case where the rotational direction of the rotor is change even number of times (for example, two times) while the normal-rotation pulse request holding circuit 27 holds the output request signal of the normal-rotation pulse, the normal-rotation pulse being output as the detecting signal corresponds to the rotational direction of the rotor. If the reverse-rotation pulse is output after the normal-rotation pulse is output because the rotor once rotates in the reverse direction, a time lag is generated between the actual rotational motion of the rotor and the detecting signal, and the normal-rotation pulse or the reverse-rotation pulse which should be output thereafter may delay.

Thus, the signal processing circuit 10 according to the present embodiment includes the first rotational-direction change determining circuit 35 and the second rotational-direction change determining circuit 36. When the reverse-rotation pulse request holding circuit 28 holds the output request signal of the reverse-rotation pulse after the output request signal of the normal-rotation pulse is output from the normal-rotation output permitting circuit 29, and then the output request signal of the normal-rotation pulse is output from the normal-rotation effective edge determining circuit 25, the first rotational-direction change determining circuit 35 outputs the reset signal so as to reset the reverse-rotation pulse output request signal held by the reverse-rotation pulse request holding circuit 28. That is, when the first rotational-direction change determining circuit 35 determines that the rotational direction of the rotor is changed from the normal direction to the reverse direction, and then from the reverse direction to the normal direction, the first rotational-direction change determining circuit 35 outputs the reset signal to the reverse-rotation pulse request holding circuit 28.

The first rotational-direction change determining circuit 35 includes DFF7, the AND5, and NAND4. To a clock terminal of the DFF7, the output request signal of the normal-rotation pulse is input. A reset terminal of the DFF7 is coupled with a pull-up power source. To a reset terminal of the DFF7, the reset signal is input similarly to the DFF5. When the output request signal of the normal-rotation pulse is output from the normal-rotation output permitting circuit 29, the DFF7 reads a signal that is input from the pull-up power source to the data input terminal and outputs a signal at the level (high level) of the reading signal. The AND5 receives the output signals from the DFF7 and the reverse-rotation pulse request holding circuit 28. The output signal of the AND5 transitions to the high level when the normal-rotation output permitting circuit 29 outputs the output request signal of the normal-rotation pulse, and the reverse-rotation pulse request holding circuit 28 holds the output request signal of the reverse-rotation pulse while the normal-rotation pulse outputting circuit 31 is outputting the normal-rotation pulse. The NAND4 receives the output signals from the AND5 and the normal-rotation effective edge determining circuit 25. Thus, when the normal-rotation effective edge determining circuit 25 determines the normal-rotation effective edge and outputs the output request signal of the normal-rotation pulse while the output signal of the AND5 is at the high level, the output signal of the NAND4 transitions to the low level.

The output signal of the NAND4 is input to the AND4 that outputs the reset signal to the DFF6 in the reverse-rotation pulse request holding circuit 28. Thus, when the NAND4 outputs the signal at the low level, the DFF6 is reset and the holding of the output request signal of the reverse-rotation pulse is released.

When the normal-rotation pulse request holding circuit 27 holds the output request signal of the normal-rotation pulse after the output request signal of the reverse-rotation pulse is output from the reverse-rotation output permitting circuit 30, and then the output request signal of the reverse-rotation pulse is output from the reverse-rotation effective edge determining circuit 26, the second rotational-direction change determining circuit 36 outputs the reset signal so as to reset the normal-rotation pulse output request signal held by the normal-rotation pulse request holding circuit 27. That is, when the second rotational-direction change determining circuit 36 determines that the rotational direction of the rotor is changed two times from the reverse direction to the normal direction, and then from the normal direction to the reverse direction, the second rotational-direction change determining circuit 36 outputs the reset signal to the normal-rotation pulse request holding circuit 27.

The second rotational-direction change determining circuit 36 includes DFF8, the AND6, and NAND5. To a clock terminal of the DFF8, the output request signal of the reverse-rotation pulse is input. A reset terminal of the DFF8 is coupled with a pull-up power source. To a reset terminal of the DFF8, the reset signal is input similarly to the DFF6. When the output request signal of the reverse-rotation pulse is output from the reverse-rotation output permitting circuit 30, the DFF8 reads a signal that is input from the pull-up power source to the data input terminal and outputs a signal at the level of the reading signal. The AND6 receives the output signals from the DFF8 and the normal-rotation pulse request holding circuit 27. The output signal of the AND6 transitions to the high level when the reverse-rotation output permitting circuit 30 outputs the output request signal of the reverse-rotation pulse, and the normal-rotation pulse request holding circuit 27 holds the output request signal of the normal-rotation pulse while the reverse-rotation pulse outputting circuit 32 is outputting the reverse-rotation pulse. The NAND5 receives the output signals from the AND6 and the normal-rotation effective edge determining circuit 26. Thus, when the reverse-rotation effective edge determining circuit 26 outputs the output request signal of the reverse-rotation pulse while the output signal of the AND6 is at the high level, the output signal of the NAND5 transitions to the low level.

The output signal of the NAND5 is input to the AND3 that outputs the reset signal to the DFF5 in the normal-rotation pulse request holding circuit 28. Thus, when the NAND5 outputs the signal at the low level, the DFF5 is reset and the holding of the output request signal of the normal-rotation pulse is released.

Because the logic circuit 20 according to the present embodiment includes the first rotational-direction change determining circuit 35 and the second rotational-direction change determining circuit 36, the logic circuit 20 can output the detecting signal that includes the normal-rotation pulse or the reverse-rotation pulse whose time lag with the actual rotational motion of the rotor is restricted.

In the logic circuit 20 according to the present embodiment, in a case where the rotational direction of the rotor is changed even number of times, the holding of the output request signal of one of the normal-rotation pulse and the reverse-rotation pulse that is opposite from one of the normal-rotation pulse and the reverse-rotation pulse being output is reset. Thus, even when a noise signal is applied and a chattering occurs in the first sensor signal, the logic circuit 20 can output the detecting signal that is not influenced by the noise signal. This is because even if a chattering is caused by a noise signal and the first sensor signal returns to an original state when the noise signal disappears, the logic circuit 20 determines that the rotational direction of the rotor is successively changed even number of times.

Figure 6:
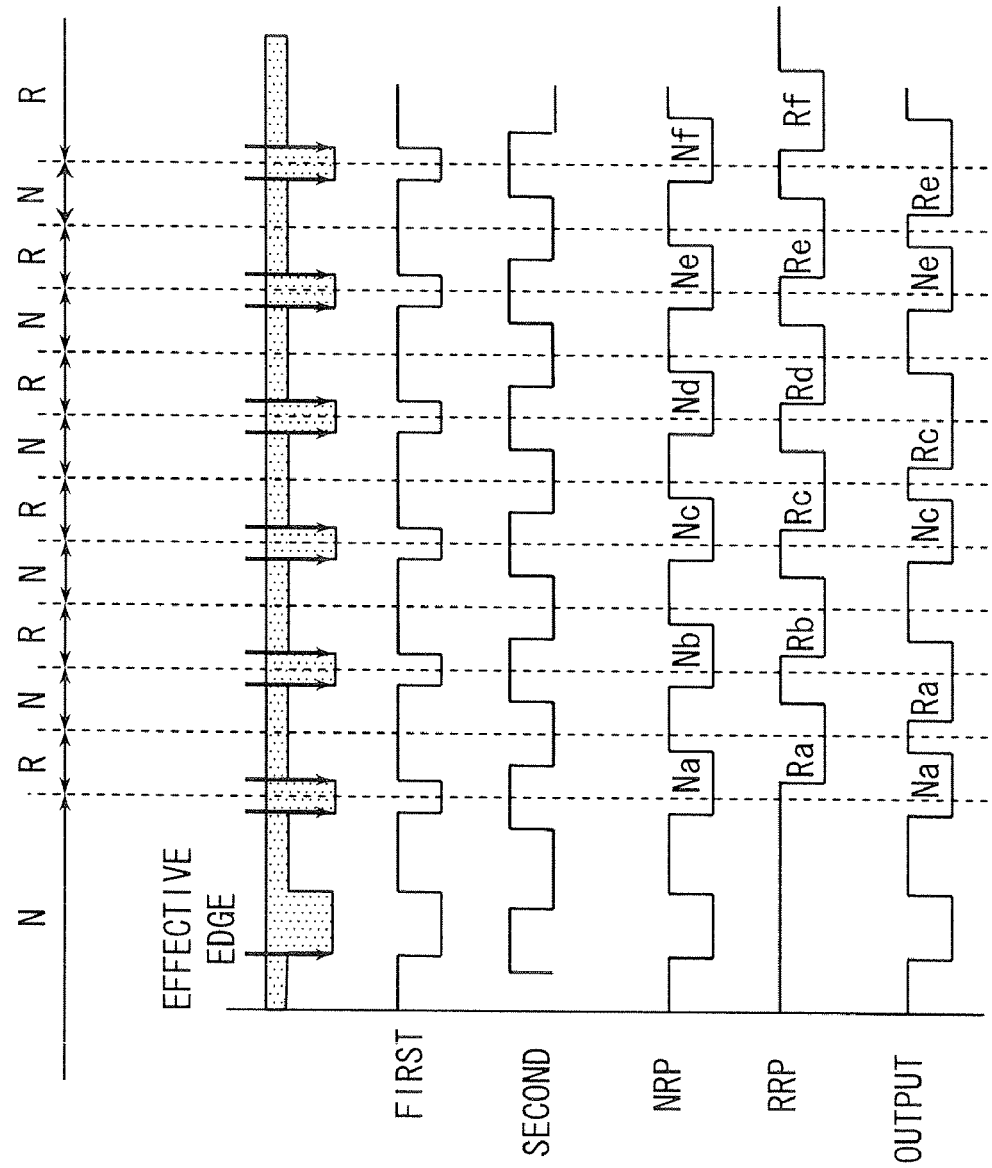
FIG. 6 is a timing diagram showing waveforms of signals processed in the logic circuit according to the first embodiment.

The waveform diagram in FIG. 6 shows an example where the rotational direction of the rotor that is rotating in the normal direction is successively changed with a short period.

When the effective edge is detected while the rotor is rotating in the normal direction, the output request signal of the normal-rotation pulse is output, and thereby the signal processing circuit 10 outputs a normal-rotation pulse Na. When the output request signal of the reverse-rotation pulse is generated while the normal-rotation pulse Na is being output, a reverse-rotation pulse Ra is not output immediately. The output request signal is held by the reverse-rotation pulse request holding circuit 28 and the signal processing circuit 10 waits the output of the reverse-rotation pulse Ra until the output of the normal-rotation pulse Na is finished. When the output of the normal-rotation pulse Na is finished, and further the waiting time elapses from a time when the output of the normal-rotation pulse Na is finished, the reverse-rotation pulse Ra is output based on the reverse-rotation pulse output request signal held by the reverse-rotation pulse request holding circuit 28.

When an output request signal of a normal-rotation pulse Nb is held by the normal-rotation pulse request holding circuit 27, and then an output request signal of a reverse-rotation pulse Rb is generated while the reverse-rotation pulse Ra is being output or during the waiting time after the output of the reverse-rotation pulse Ra is finished, the output request signal of the normal-rotation pulse Nb held by the normal-rotation pulse request holding circuit 27 is reset. Thus, the signal processing circuit 10 can restrict a time lag between the detecting signal and the actual rotational motion of the rotor.

Even when the reverse-rotation effective edge determining circuit 26 outputs the output request signal of the reverse-rotation pulse Rb, the reverse-rotation pulse request holding circuit 28, which already holds the output request signal of the reverse-rotation pulse Ra, continues to hold the output request signal of the reverse-rotation pulse Ra. That is, the reverse-rotation pulse request holding circuit 28 continues to hold the output request signal of the reverse-rotation pulse Ra without being affected by the generation of the output request signal of the new reverse-rotation pulse Nb. In the present case, only the rotational direction of the rotor is changed two times from the reverse direction to the normal direction, and then from the normal direction to the reverse direction, and the positions of the gear teeth do not change. Thus, if the signal processing circuit 10 outputs the reverse-rotation pulse Rb based on the output request signal of the reverse-rotation pulse Rb, the positions of the gear teeth may be detected inaccurately due to the reverse-rotation pulse in the detecting signal.

Therefore, in the signal processing circuit 10 according to the present embodiment, even when the output request signal of the normal-rotation pulse Nb and the output request signal of the reverse-rotation pulse Rb are generated while the reverse-rotation pulse Ra is being output, the normal-rotation pulse Nb and the reverse-rotation pulse Rb are not output. As long as the rotational direction of the rotor is changed with a short period, the above-described signal process is performed by the signal processing circuit 10.

The first chattering determining circuit 40, the second chattering determining circuit 41, and the switching devices 42 and 43 are described below. A circuit configuration of the first chattering determining circuit 40 is similar to a circuit configuration of the second chattering determining circuit 41, and a circuit configuration of the switching device 42 is similar to a circuit configuration of the switching device 43. Thus, the circuit configurations and operations of the first chattering determining circuit 40 and the switching device 42 will be described as examples. In a case where both of the first chattering determining circuit 40 and the second chattering determining circuit 41 receive the signals from the normal-rotation pulse request holding circuit 27 and the reverse-rotation pulse request holding circuit 28, the switching devices 42 and 43 can be controlled by one common chattering determining circuit.

Figure 8:
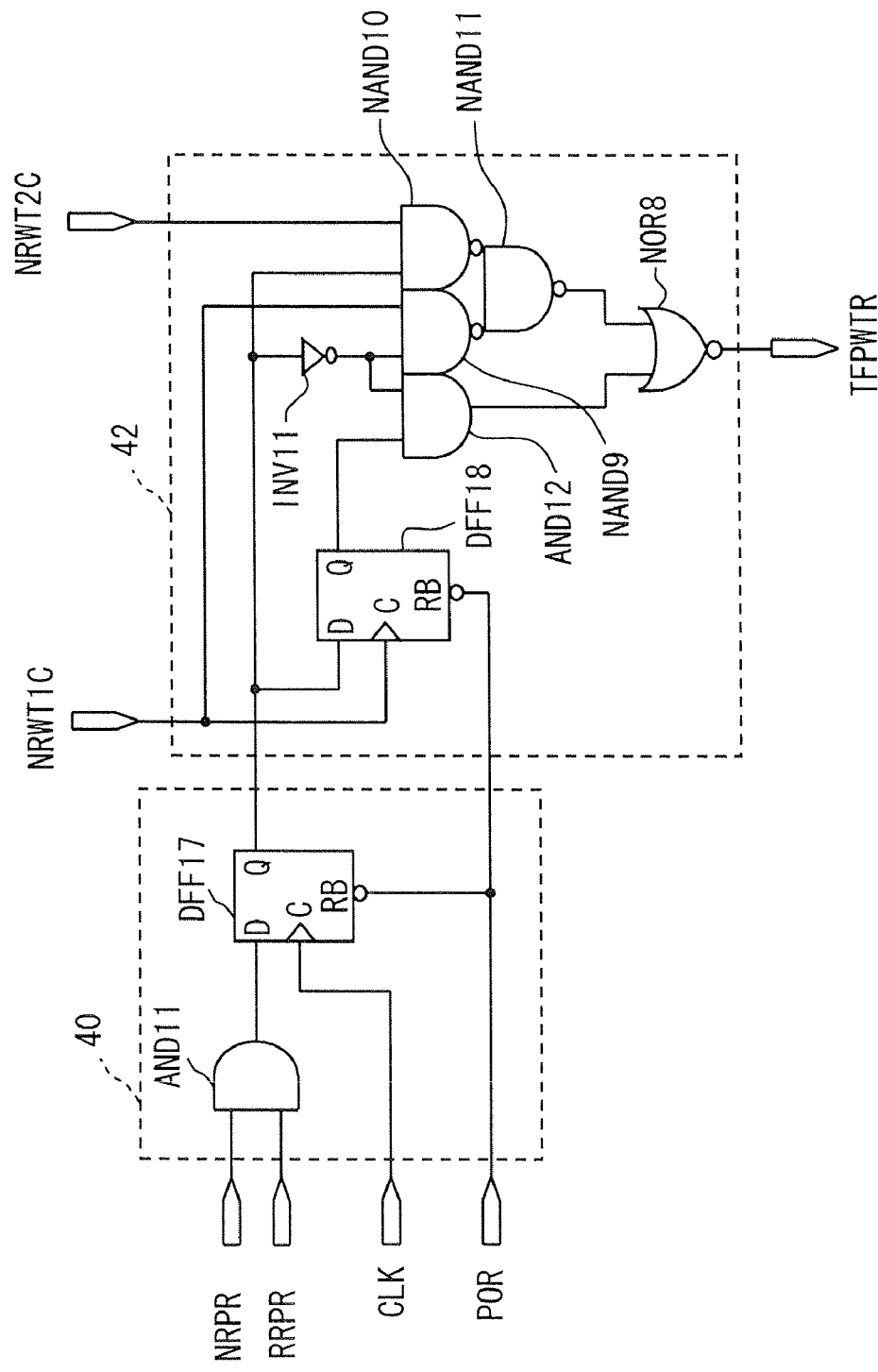
FIG. 8 is a circuit diagram showing a first chattering determining circuit and a switching device in the logic circuit.

As shown in FIG. 8, the first chattering determining circuit 40 includes AND11 and DFF17. The AND11 receives the output request signal from the normal-rotation pulse request holding circuit 27 and the output request signal from the reverse-rotation pulse request holding circuit 28. Thus, the AND11 outputs a signal at the high level when the normal-rotation pulse output request signal (NRPR) is held by the normal-rotation pulse request holding circuit 27 and the reverse-rotation pulse output request signal (RRPR) is held by the reverse-rotation pulse request holding circuit 28. In contrast, when only one of the normal-rotation pulse request holding circuit 27 and the reverse-rotation pulse request holding circuit 28 holds the output request signal or when neither the normal-rotation pulse request holding circuit 27 nor the reverse-rotation pulse request holding circuit 28 holds the output request signal, the AND11 outputs a signal at the low level.

As a signal input to the AND11, the output signal from the normal-rotation output permitting circuit 29 may also be used instead of the output signal from the normal-rotation pulse request holding circuit 27. However, the normal-rotation output permitting circuit 29 outputs the normal-rotation pulse output request signal having a pulse shape. Thus, in the present case, the signal processing circuit 10 is required to have a delayed flip flop for holding the pulse-shaped output signal of the normal-rotation output permitting circuit 29 in a manner similar to the first rotational-direction change determining circuit 35 and to input an output signal from the delayed flip flop to the AND11. In a case where the signal processing circuit 10 is configured as described above, the signal processing circuit 10 can detect that a reverse-rotation pulse output request signal is generated after a normal-rotation pulse output request signal is generated based on the output signal from the AND11. Thus, the signal processing circuit 10 can certainly determine that the condition for switching the normal-rotation waiting time is satisfied. In the present case, the signal processing circuit 10 is required to have the first chattering determining circuit 40 and the second chattering determining circuit 41 separately.

An output terminal of the AND is coupled with a data input terminal of the DFF17. The clock signal CLK from the clock signal generator 12 is also input to a clock terminal of the DFF17. Thus, when a signal at the low level is output from the AND11, the DFF17 outputs a signal at the low level from a data output terminal in synchronization with the clock signal CLK. When a signal at the high level is output from the AND11, the DFF17 outputs a signal at the high level. The POR signal is also input to a reset terminal of the DFF17.

The output signal of the DFF17 is input to the switching device 42 as a decision signal of the first chattering determining circuit 40. As shown in FIG. 42, the switching device 42 includes DFF18, INV11, AND12, NAND9, NAND10 NAND11, and NOR8.

Figure 9:
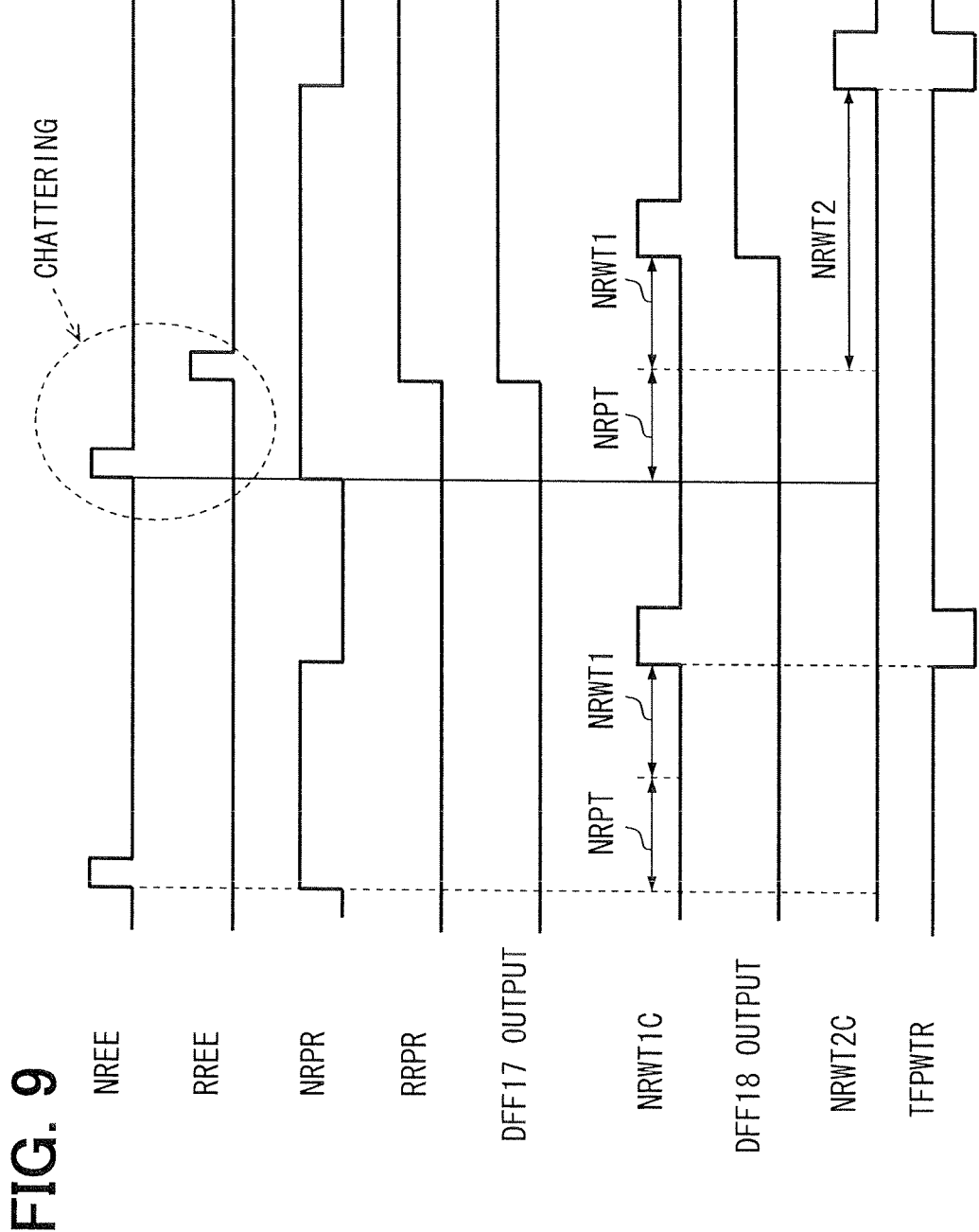
FIG. 9 is a timing diagram showing waveforms of signals processed in the logic circuit.

For example, as shown in a left part of FIG. 9, when the normal-rotation effective edge (NREE) is detected, the normal-rotation pulse output request signal (NRPR) is input to the normal-rotation pulse request holding circuit 27, and the reverse-rotation pulse output request signal (RRPR) is not held by the reverse-rotation pulse request holding circuit 28, the DFF17 on the first chattering determining circuit 40 outputs a signal at the low level. Then, the INV11 inverts the output signal of the DFF17, and a signal at the high level is input to an input terminal of the NAND9. To the other input terminal of the NAND9, a first normal-rotation waiting time counter signal (NRWT1C) is input. The normal-rotation waiting time counter signal becomes the high level when the first normal-rotation waiting time (NRWT1) is counted. When the first normal-rotation waiting time counter signal at the high level is input to the NAND9, an output signal of the NAND9 transitions from the high level to the low level. The output signal of the NAND9 is input to an input terminal of the NAND11. When the NAND11 receives the output signal at the low level from the NAND9, an output signal of the NAND11 transitions from the low level to the high level, and thereby an output signal of the NOR8 transitions from the high level to the low level. The output signal of the NOR8 is input to the normal-rotation pulse request holding circuit 27 and the normal-rotation pulse timing control circuit 37 as the normal-rotation waiting time reset signal (TFPWTR). Accordingly, the normal-rotation pulse output request signal held by the normal-rotation pulse request holding circuit 27 is reset, and a counting operation of the timer 13 is stopped.

In this way, when only the normal-rotation pulse output request signal is held and the reverse-rotation pulse output request signal is not held, the first normal-rotation waiting time shorter than the second normal-rotation waiting time is used as the waiting time for securing the interval between successive pulses after the normal-rotation pulse is output. Thus, even when the rotor rotates in the normal direction at a high speed, the first normal-rotation waiting time elapses and the normal-rotation pulse output request signal held by the normal-rotation pulse request holding circuit 27 can be reset before the normal-rotation pulse effective edge determining circuit 25 outputs the next output request signal of the normal-rotation pulse. Thus, even when the rotor rotates at a high speed, a lack of the pulse can be restricted.

Furthermore, in the present embodiment, the sum of the first normal-rotation waiting time (NRWT1) and the normal-rotation pulse time (NRPT) is set to be shorter than the interval of the generation of the normal-rotation pulse output request signal. The length of the waiting time is set so that the ECU50 can recognize the normal-rotation pulse even when the detecting signal is smoothed by the ECU filter. Thus, even when the rotor rotates in the normal direction at the maximum speed, a lack of the normal-rotation pulse can be certainly restricted.

For example, in a case where the rotor is disposed in such a manner that the rotor rotates with an engine of a vehicle and the rotation detector detects the number of rotation of the engine, the maximum speed is set to be 1000 rpm, the rotor has a pitch of 6 degrees, and the rotor has 60 gear teeth, an interval between the effective edges corresponding to the interval of the generation of the normal-rotation pulse output request signal is 100 μs. Because the pulse width of the normal-rotation pulse is 45 μs, the maximum acceptable value of the first normal-rotation waiting time is 55 μs. The first normal-rotation waiting time is set to be a value less than or equal to the maximum acceptable value and greater than or equal to the minimum waiting time that depends on the time constant of the ECU filter and the reference voltage level.

An operation of each part of the logic circuit 20 when the first normal-rotation waiting time is used as the waiting time after the normal-rotation pulse is output and the rotor rotates in the reverse direction will be described with reference to FIG. 10.

Figure 10:
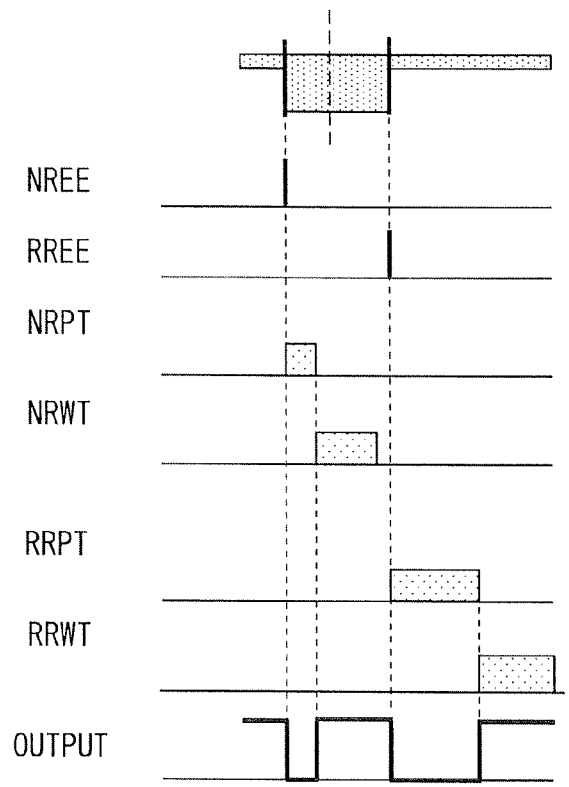
FIG. 10 is a diagram showing waveforms of signals processed in the logic circuit when the rotor rotates in a reverse direction in a case where a first normal-rotation waiting time is used as a waiting time after a normal-rotation pulse is output.

As shown in FIG. 10, when the normal-rotation effective edge (NREE) is detected, and the normal-rotation pulse output request signal is held by the normal-rotation pulse request holding circuit 27, the normal-rotation pulse is output. In a case where the reverse-rotation pulse output request signal is not held by the reverse-rotation pulse request holding circuit 28 during the normal-rotation pulse time (NRPT) and the first normal-rotation waiting time (NRWT), the normal-rotation pulse output request signal held by the normal-rotation pulse request holding circuit 27 is reset at a time when the first normal-rotation waiting time elapses. Then, when the reverse-rotation effective edge (RREE) is detected and the reverse-rotation pulse output request signal is held by the reverse-rotation pulse request holding circuit 28, the reverse-rotation pulse is output for the reverse-rotation pulse time (RRPT).

Next, a case where the reverse-rotation pulse output request signal is held by the reverse-rotation pulse request holding circuit 28 while the normal-rotation pulse output request signal is held by the normal-rotation pulse request holding circuit 27 will be described.

For example, as shown in a right part of FIG. 9, when the normal-rotation effective edge (NREE) is detected and the normal-rotation pulse output request signal (NRPR) is held by the normal-rotation pulse request holding circuit 27, and then the reverse-rotation effective edge (RREE) is detected and the reverse-rotation pulse output request signal (RRPR) is held by the reverse-rotation pulse request holding circuit 28 before the normal-rotation pulse time and the first normal-rotation pulse waiting time elapse, both the normal-rotation pulse request holding circuit 27 and the reverse-rotation pulse request holding circuit 28 hold the output request signals. In this case, the DFF17 in the first chattering determining circuit 40 output the signal at the high level.

The output signal of the DFF17 is inverted by the INV11 and the signal at the low level output from the INV11 is input to the input terminal of the NAND9. Thus, even when the first normal-rotation waiting time (NRWT1) elapses and the first normal-rotation waiting time counter signal (NRWT1C) at the high level is input to the other input terminal of the NAND9, the output signal of the NAND9 remains the high level. As a result, the output signal of the NAND11 remains the low level, and the output signal of the NOR8 remains the high level. Therefore, at a time when the first normal-rotation waiting time elapses, the normal-rotation waiting time reset signal (TFPWTR) is not output.

When the second normal-rotation waiting time (NRWT2) elapses and the second normal-rotation waiting time counter signal (NRWT2C) at the high level is output, the output signal of the NAND10 to which the output signal of the DFF17 and the second normal-rotation waiting time counter signal are input transitions from the high level to the low level. Then, the output signal of the NAND11 to which the output signal of the NAND10 is input transitions from the low level to the high level. As a result, the output signal of the NOR8 transitions from the high level to the low level. Therefore, at a time when the second normal-rotation waiting time elapses, the normal-rotation waiting time reset signal (TFPWTR) is output from the switching device 42.

In this way, when both the normal-rotation pulse request holding circuit 27 and the reverse-rotation pulse request holding circuit 28 hold the output request signals, the waiting time after the normal-rotation pulse is output is switched to the second normal-rotation waiting time that is longer than the first normal-rotation waiting time. It is when the normal-rotation pulse output request signal and the reverse-rotation pulse output request signal are generated at a short interval that both the normal-rotation pulse request holding circuit 27 and the reverse-rotation pulse request holding circuit 28 hold the output request signals. In this case, there is a possibility that the rotational direction of the rotor is successively changed with a short period or a chattering state, where a sensor signal is output due to noise as if the rotational direction of the rotor is successively changed with a short period, occurs.

In the chattering state, the normal-rotation effective edge may be detected and the condition for holding the normal-rotation pulse output request signal may be satisfied after the reverse-rotation pulse output request signal is generated. Thus, by switching the waiting time to the second normal-rotation waiting time that is longer than the first normal-rotation waiting time, an opportunity that the first rotational-direction change determining circuit 35 determines that the rotational direction of the rotor is changed even number of times is increased, and thereby an output of unnecessary pulse can be restricted.

An operation of each part of the logic circuit 20 when the rotor rotates in the reverse-direction in a case where the second normal-rotation waiting time is used as the waiting time after the normal-rotation pulse is output will be described with reference to FIG. 11.

Figure 11:
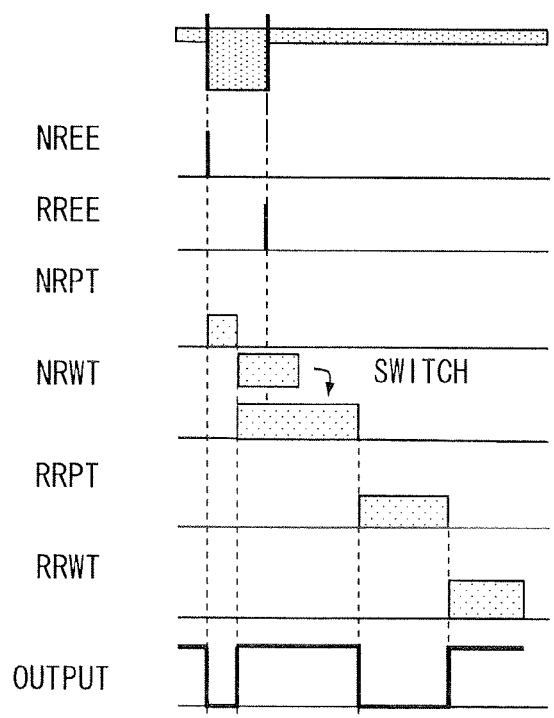
FIG. 11 is a diagram showing waveforms of signals processed in the logic circuit when the rotor rotates in a reverse direction in a case where a second normal-rotation waiting time is used as a waiting time after a normal-rotation pulse is output.

As shown in FIG. 11, when the normal-rotation effective edge (NREE) is detected, and the normal-rotation pulse output request signal is held by the normal-rotation pulse request holding circuit 27, the normal-rotation pulse is output. When the reverse-rotation effective edge (RREE) is detected and the reverse-rotation pulse output request signal is held by the reverse-rotation pulse request holding circuit 28 during the normal-rotation pulse time (NRPT) or the first normal-rotation waiting time, the normal-rotation waiting time (NRWT) is switched from the first normal-rotation waiting time to the second normal-rotation waiting time. Thus, the normal-rotation pulse output request signal is not reset even when the first normal-rotation waiting time elapses, and the normal-rotation pulse output request signal is held until the second normal-rotation waiting time elapses. Therefore, the reverse-rotation pulse output request signal is also held until the second normal-rotation waiting time elapses after the normal-rotation pulse is output. Then, when the second normal-rotation waiting time elapses and the normal-rotation pulse output request signal is reset, the reverse-rotation pulse is output for the reverse-rotation pulse time (RRPT) based on the reverse-rotation pulse output request signal held by the reverse-rotation pulse request holding circuit 28.

Next, a case where, while the normal-rotation pulse output request signal is held by the normal-rotation pulse request holding circuit 27, the reverse-rotation pulse output request signal is held by the reverse-rotation pulse request holding circuit 28 and further the normal-rotation effective edge is detected and the condition for holding normal-rotation pulse output request signal is satisfied will be described.

When the normal-rotation pulse output request signal (NRPR) is held by the normal-rotation pulse request holding circuit 27 and the reverse-rotation pulse output request signal (RRPR) is held by the reverse-rotation pulse request holding circuit 28 before the normal-rotation pulse time (NRPT) and the first normal-rotation waiting time (NRWT1) elapses, the output signal of the DFF17 of the first chattering determining circuit 40 transitions from the low level to the high level.

The output signal of the DFF17 is input to a data input terminal of the DFF18 in the switching device 42. To a clock terminal of the DFF18, the first normal-rotation waiting time counter signal (NRWT1C) is input. Thus, when the first normal-rotation waiting time (NRWR1) elapses in a state where the DFF17 outputs the signal at the high level, the DFF18 holds the high level signal from the DFF17 and outputs a signal at the high level from a data output terminal of the DFF18.

When the normal-rotation effective edge determining circuit 25 detects the normal-rotation effective edge and the condition for holding the normal-rotation pulse output request signal is satisfied after the first normal-rotation waiting time elapses and before the second normal-rotation waiting time elapses, the first rotational-direction change determining circuit 35 determines that the rotational direction of the rotor is changed even number of times (two times), the reverse-rotation pulse output request signal held by the reverse-rotation pulse request holding circuit is reset. Then, the output signal of the AND11 transitions from the high level to the low level, and the output signal of the DFF17 transitions from the high level to the low level.

The output signal of the DFF17 is input to the AND12 through the INV17 and the output signal of the DFF18 is also input to the AND12. Thus, when the output signal of the DFF17 transitions to the low level, both the signals input to the AND12 become the high level, and the AND12 outputs the signal at the high level. Accordingly, the output signal of the NOR8 transitions from the high level to the low level. Therefore, even before the second normal-rotation waiting time elapses, the switching device 42 outputs the normal-rotation waiting time reset signal (TFPWTR) at a time when the holding of the reverse-rotation pulse output request signal is reset.

In a case where the first rotational-direction change determining circuit 35 resets the holding of the output request signal of the reverse-rotation pulse that waits to be output, an output of unnecessary pulse due to a chattering is restricted. Because demand for continuing the waiting time after the reverse-rotation pulse output request signal is reset is low, the normal-rotation waiting time reset signal is output even before the second normal-rotation waiting time elapses, and the output request signal of the normal-rotation pulse that has already been output is reset. In this case, when the output request signal of the normal-rotation pulse or the reverse-rotation pulse is generated after the output request signal of the normal-rotation pulse is reset, the output request signal can be held.

The DFF18 holds the output signal of the DFF17 at a time when the first normal-rotation waiting time elapses. Thus, in a case where the first rotational-direction change determining circuit 35 resets the reverse-rotation pulse output request signal before the first normal-rotation waiting time elapses and the output signal of the DFF17 is at the low level at a time when the first normal-rotation waiting time elapses, the normal-rotation waiting time reset signal is output at a time when the first normal-rotation waiting time elapses.

An operation of each part of the logic circuit 20 in a case where a waiting time having a length between the first normal-rotation waiting time and the second normal-rotation waiting time is used will be described with reference to FIG. 12.

Figure 12:
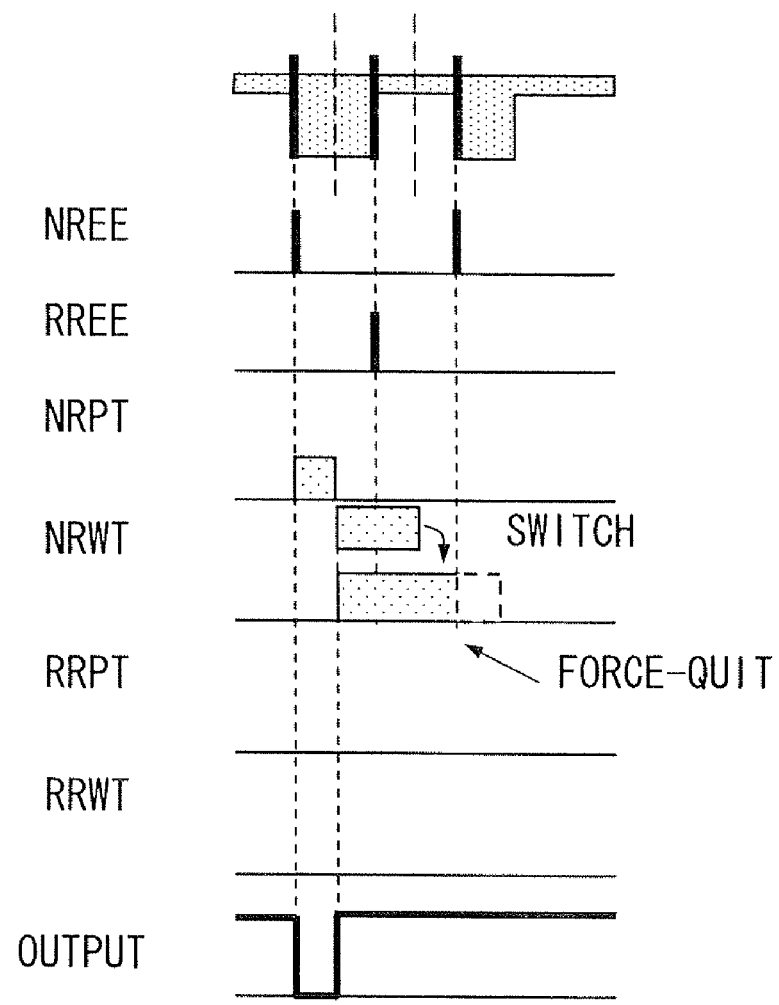
FIG. 12 is a diagram showing waveforms of signals processed in the logic circuit in a case where a waiting time having a length between the first normal-rotation waiting time and the second normal-rotation waiting time is used as a waiting time after a normal-rotation pulse is output.
Figure 13:
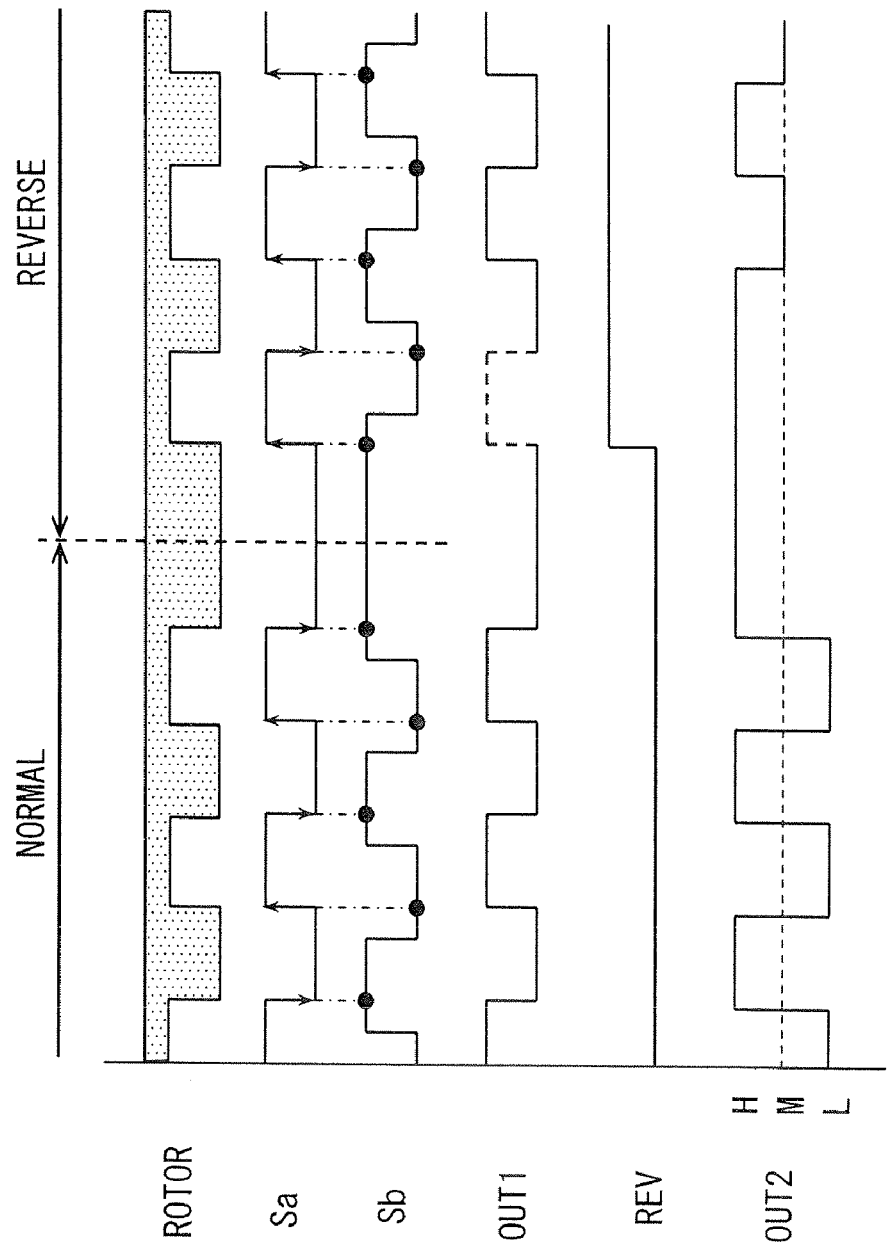
FIG. 13 is a timing diagram showing waveforms of signals processed in a rotation detector according to the prior art.

As shown in FIG. 12, when the normal-rotation effective edge (NREE) is detected and the normal-rotation pulse output request signal is held, the normal-rotation pulse is output for the normal-rotation pulse time (NRPT). When the reverse-rotation effective edge (RREE) is detected and the reverse-rotation pulse output request signal is held during the normal-rotation pulse time (NRPT) or the first normal-rotation waiting time, the normal-rotation waiting time (NRWT) after the normal-rotation pulse is output is switched from the first normal-rotation waiting time to the second normal-rotation waiting time. Thus, even when the first normal-rotation waiting time elapses, the holding of the normal-rotation pulse output request signal is not reset. However, another normal-rotation effective edge (NREE) is detected and the condition for holding the normal-rotation pulse output request signal is satisfied after the first normal-rotation waiting time elapses and before the second normal-rotation waiting time elapses, the holding of the reverse-rotation pulse output request signal is reset. Thus, at the time, the normal-rotation waiting time reset signal (FPWTR) is output and the normal-rotation waiting time is forced to quit.

As described above, the first chattering determining circuit 40 and the second chattering determining circuit 41 have the similar configurations, and the switching device 42 and the switching device 43 have similar configurations. The normal-rotation waiting time (NRWT) and the reverse-rotation waiting time (RRWT) may have different lengths.

For example, in a case where the rotor is disposed in such a manner that the rotor rotates with an engine of a vehicle and the rotor detects the number of rotation of the engine, the maximum speed when the engine rotates in the normal direction may be lower than the maximum speed when the engine rotates in the reverse direction, for example, when the engine is stopped.

For example, the maximum speed when the engine rotates in the reverse direction is about 3000 rpm. When the rotor has a pitch of 6 degrees and the rotor has 60 teeth, the interval of the effective edges which corresponds to the interval of the generation of the reverse-rotation pulse output request signal is 333 μs. Because the pulse width of the reverse-rotation pulse is 180 μs, the maximum acceptable value of the first reverse-rotation waiting time is 153 μs. The first reverse-rotation waiting time is set to be a value less than or equal to the maximum acceptable value and greater than or equal to the minimum waiting time that depends on the time constant of the ECU filter and the reference voltage level.

In a case where the maximum speed when the rotor rotates in the normal direction is higher than the maximum speed when the rotor rotates in the reverse direction, the pulse width of the normal-rotation pulse may be shorter than the pulse width of the reverse-rotation pulse, and the first and second normal-rotation waiting times may be respectively shorter than the first and second reverse-rotation waiting times. Accordingly, the pulse widths and the waiting times of the normal-rotation pulse and the reverse-rotation pulse can be set appropriately for the rotational speed of respective rotational directions.

The engine rotates in the reverse direction when the engine is stop-controlled by an engine control device. When the engine control device performs the stop control, the engine control device needs to confirm whether the engine actually rotates in the reverse direction based on various sensor signals. When the first reverse-rotation waiting time and the second reverse-rotation waiting time associated with the reverse-rotation pulse are respectively set to be longer than the first normal-rotation waiting time and the second normal-rotation waiting time associated with the normal-rotation pulse, the engine control device can secure a time for the confirming process.

Other Embodiments

Although the present invention has been fully described in connection with the preferred embodiments thereof with reference to the accompanying drawings, it is to be noted that various changes and modifications will become apparent to those skilled in the art.

For example, in the above-described embodiment, each signal process in the rotation detector is realized by using the logic circuit. Alternatively, each signal process can be realized by using software in the ECU.

In the above-described embodiment, the timer 13 starts to count the waiting time when the output of the pulse is finished. The timer 13 may also start to count the waiting time when the output of the pulse is started with increasing the length of the waiting time by the output time of the pulse.

What is claimed is:

1. A signal processing circuit of a rotation detector that outputs a detection signal for detecting a rotational position of a rotating object based on first and second sensor signals having different phases and rectangular shapes and output from a plurality of magnetic sensors arranged opposite the rotating object having gear teeth in accordance with movement of top lands and bottom lands of the gear teeth when the rotating object rotates in a normal direction or a reverse direction, the signal processing circuit comprising:

a rotational-direction determining portion configured to determine whether a rotational direction of the rotating object is the normal direction or the reverse direction based on a phase relationship between the first sensor signal and the second sensor signal;

an effective edge determining portion configured to determine whether a change in the first sensor signal is caused by an effective edge, the effective edge determining portion determining that the change in the first sensor signal is caused by the effective edge when the change is caused by one of front edges of the top lands while the rotating object is rotating in one of the normal direction and the reverse direction or when the change is caused by one of rear edges of the top lands while the rotating object is rotating in the other one of the normal direction and the reverse direction;

a normal-rotation pulse request holding portion configured to hold an output request signal of a normal-rotation pulse when the rotational-direction determining portion determines that the rotational direction is the normal direction and the effective edge determining portion determines that the change in the first sensor signal is caused by the effective edge, the normal-rotation pulse indicating that the rotating object is rotating in the normal direction;

a reverse-rotation pulse request holding portion configured to hold an output request signal of a reverse-rotation pulse when the rotational-direction determining portion determines that the rotational direction is the reverse direction and the effective edge determining portion determines that the change in the first sensor signal is caused by the effective edge, the reverse-rotation pulse indicating that the rotating object is rotating in the reverse direction;

an output request signal outputting portion configured so that when one of the normal-rotation pulse request holding portion and the reverse-rotation pulse request holding portion holds the output request signal, the output request signal outputting portion permits an output of the output request signal held by the one of the normal-rotation pulse request holding portion and the reverse-rotation pulse request holding portion, and when the other one of the normal-rotation pulse request holding portion and the reverse-rotation pulse request holding portion holds the output request signal in a state where the one of the normal-rotation pulse request holding portion and the reverse-rotation pulse request holding portion holds the output request signal, the output request signal outputting portion waits an output of the output request signal held by the other one of the normal-rotation pulse request holding portion and the reverse-rotation pulse request holding portion until the output request signal held by the one of the normal-rotation pulse request holding portion and the reverse-rotation pulse request holding portion is reset;

a pulse outputting portion configured to output one of the normal-rotation pulse and the reverse-rotation pulse as the detection signal based on the output request signal from the output request signal outputting portion;

a first resetting potion configured so that after the pulse outputting portion ends an output of one of the normal-rotation pulse and the reverse-rotation pulse and a waiting time elapses, the first resetting portion resets the output request signal of the one of the normal-rotation pulse and the reverse-rotation pulse, the output of which ends, held by the one of the normal-rotation pulse request holding portion and the reverse-rotation pulse request holding portion;

a second resetting portion configured so that when the other one of the normal-rotation pulse request holding portion and the reverse-rotation pulse request holding portion holds the output request signal and then a condition for holding the output request signal that is already held by the one of the normal-rotation pulse request holding portion and the reverse-rotation pulse request holding portion is satisfied in a state where the one of the normal-rotation pulse request holding portion and the reverse-rotation pulse request holding portion holds the output request signal, the second resetting portion resets the output request signal held by the other one of the normal-rotation pulse request holding portion and the reverse-rotation pulse request holding portion; and a waiting time switching portion configured to set the waiting time to a first waiting time when one of the normal-rotation pulse request holding portion and the reverse-rotation pulse request holding portion holds the output request signal, and set the waiting time to a second waiting time that is longer than the first waiting time when both the normal-rotation pulse request holding portion and the reverse-rotation pulse request holding portion hold the output request signals.

2. The signal processing circuit of the rotation detector according to claim 1, wherein when the second resetting portion resets the output request signal held by the other one of the normal-rotation pulse request holding portion and the reverse-rotation pulse request holding portion after the first waiting time elapses and before the second waiting time elapses, the waiting time switching portion controls the first resetting portion to output the first resetting signal in response to the reset of the output request signal by the second resetting portion even before the second waiting time elapses.

3. The signal processing circuit of the rotation detector according to claim 1, wherein the first waiting time is set in such a manner that a sum of a pulse width of the normal-rotation pulse or the reverse-rotation pulse and the first waiting time is shorter than an interval of a generation of the output request signal of the normal-rotation pulse or the reverse-rotation pulse when the rotating object rotates in the normal direction or the reverse direction at a maximum speed.

4. The signal processing circuit of the rotation detector according to claim 1, wherein a maximum speed of the rotating object when the rotating object rotates in the normal direction is higher than a maximum speed of the rotating object when the rotating object rotates in the reverse direction, wherein a pulse width of the normal pulse signal output from the pulse outputting portion is shorter than a pulse width of the reverse pulse signal, and wherein the first waiting time and the second waiting time associated with the normal-rotation pulse are respectively shorter than the first waiting time and the second waiting time associated with the reverse-rotation pulse.

5. The signal processing circuit of the rotation detector according to claim 4, wherein the waiting time switching portion includes a first waiting time switching portion configured to switch the waiting time associated with the normal-rotation pulse based on that the output request signal outputting portion outputs the output request signal of the normal-rotation pulse and that the output request signal of the reverse-rotation pulse is held by the reverse-rotation pulse request holding portion, and a second waiting time switching portion configured to switch the waiting time associated with the reverse-rotation pulse based on that the output request signal outputting portion outputs the output request signal of the reverse-rotation pulse and that the output request signal of the normal-rotation pulse is held by the normal-rotation pulse request holding portion.

* * * * *